US008790807B2

(12) United States Patent
Hara et al.

(10) Patent No.: US 8,790,807 B2
(45) Date of Patent: *Jul. 29, 2014

(54) BATTERY DEVICE, ELECTRONIC APPARATUS, AND BATTERY SYSTEM

(71) Applicant: Sony Corporation, Tokyo (JP)

(72) Inventors: Mieko Hara, Tokyo (JP); Toshio Takeshita, Kanagawa (JP); Yoichi Miyajima, Tokyo (JP); Hiroaki Sato, Kanagawa (JP); Tomonori Watanabe, Tokyo (JP); Naoki Kamaya, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/849,776

(22) Filed: Mar. 25, 2013

(65) Prior Publication Data

US 2013/0209855 A1    Aug. 15, 2013

Related U.S. Application Data

(63) Continuation of application No. 13/458,601, filed on Apr. 27, 2012, now Pat. No. 8,470,465, which is a continuation of application No. 13/116,781, filed on May 26, 2011, now Pat. No. 8,241,774, which is a continuation of application No. 11/836,310, filed on Aug. 9, 2007, now Pat. No. 7,989,101.

(30) Foreign Application Priority Data

Aug. 28, 2006   (JP) ................................. 2006-230797

(51) Int. Cl.
*H01M 2/10* (2006.01)
*H01M 2/02* (2006.01)

(52) U.S. Cl.
USPC .............................. 429/100; 429/97; 429/123

(58) Field of Classification Search
USPC ............................................ 429/96–100, 123
See application file for complete search history.

(56) References Cited

U.S. PATENT DOCUMENTS 4,943,498 A    7/1990   Cooper et al.
5,180,644 A    1/1993   Bresin et al.
(Continued)

FOREIGN PATENT DOCUMENTS

CN          1765023 A       4/2006
DE      199 21 356 A1      11/1999
(Continued)

OTHER PUBLICATIONS

English translation of International Written Opinion issued in International Application No. PCT/JO2004/019776, filed Dec. 24, 2004.

(Continued)

*Primary Examiner* — Gregg Cantelmo
(74) *Attorney, Agent, or Firm* — Oblon, Spivak, McClelland, Maier & Neustadt, L.L.P.

(57) ABSTRACT

Disclosed is a battery device including a battery enclosure incorporating a battery cell. The battery device further includes an output terminal that outputs power of the battery cell. The battery enclosure includes a first surface, a second surface, a first step surface, a second step surface, a first engaging portion, a second engaging portion, a first groove, and a second groove formed in the second step surface and the second engaging portion, and a recess is provided in at least one of the first step surface and the second step surface.

20 Claims, 14 Drawing Sheets

(56) References Cited

U.S. PATENT DOCUMENTS

| | | | |
|---|---|---|---|
| 5,415,947 | A | 5/1995 | Mitsui et al. |
| 5,434,018 | A | 7/1995 | Sasaki et al. |
| 5,436,088 | A | 7/1995 | Castaneda et al. |
| D362,424 | S | 9/1995 | Sumita et al. |
| 5,502,366 | A | 3/1996 | Lee |
| 5,506,322 | A | 4/1996 | Ichikawa et al. |
| 5,510,205 | A | 4/1996 | Ozer |
| 5,602,454 | A | 2/1997 | Arakawa et al. |
| 5,626,979 | A | 5/1997 | Mitsui et al. |
| 5,824,431 | A | 10/1998 | Tsurumaru et al. |
| D417,861 | S | 12/1999 | Maeyama |
| D425,479 | S | 5/2000 | Meinicoff |
| 6,057,608 | A | 5/2000 | Bailey, Jr. et al. |
| 6,068,946 | A | 5/2000 | Zedell, Jr. et al. |
| 6,127,063 | A | 10/2000 | Kowalsky et al. |
| 6,146,210 | A | 11/2000 | Cha et al. |
| 6,171,126 | B1 | 1/2001 | Wu et al. |
| 6,261,715 | B1 | 7/2001 | Nakamura et al. |
| 6,485,861 | B2 | 11/2002 | Takeshita et al. |
| 6,521,370 | B1 | 2/2003 | Takeshita et al. |
| 6,524,370 | B2 | 2/2003 | Maheshwary et al. |
| D473,186 | S | 4/2003 | Grosfeld et al. |
| 6,577,101 | B1 | 6/2003 | Takeshita et al. |
| 6,729,413 | B2 | 5/2004 | Turner et al. |
| D515,499 | S | 2/2006 | Matsuda et al. |
| D535,253 | S | 1/2007 | Buck |
| 7,306,878 | B2 | 12/2007 | Takeshita et al. |
| 7,648,795 | B2 | 1/2010 | Nagai et al. |
| 2004/0058231 | A1 | 3/2004 | Takeshita et al. |
| 2006/0068280 | A1 | 3/2006 | Takeshita et al. |
| 2007/0148535 | A1 | 6/2007 | Nagai et al. |
| 2008/0050648 | A1 | 2/2008 | Hara et al. |

FOREIGN PATENT DOCUMENTS

| | | |
|---|---|---|
| EP | 0 617 486 A1 | 9/1994 |
| EP | 0 694 980 A2 | 1/1996 |
| EP | 1 411 565 A1 | 4/2004 |
| GB | 2 317 062 A | 3/1998 |
| JP | 62-140669 | 9/1987 |
| JP | 1-155654 | 10/1989 |
| JP | 4-40462 | 4/1992 |
| JP | 5-67462 | 3/1993 |
| JP | 6-104017 | 4/1994 |
| JP | 06-104017 | 4/1994 |
| JP | 07-113855 | 5/1995 |
| JP | 07-312212 | 11/1995 |
| JP | 07-335186 | 12/1995 |
| JP | 8-139979 | 5/1996 |
| JP | 8-320071 | 12/1996 |
| JP | 9-27306 | 1/1997 |
| JP | 09-069360 | 3/1997 |
| JP | 9-161852 | 6/1997 |
| JP | 09-330741 | 12/1997 |
| JP | 11-274751 | 10/1999 |
| JP | 2000-82501 | 3/2000 |
| JP | 2000-243365 | 9/2000 |
| JP | 2000-268883 | 9/2000 |
| JP | 2000-323123 | 11/2000 |
| JP | 2002-15715 | 1/2002 |
| JP | 2003-036828 | 2/2003 |
| JP | 2005-100689 | 4/2005 |
| JP | 2005-227895 | 5/2005 |
| JP | 2005-190929 | 7/2005 |
| JP | 2005-190943 | 7/2005 |
| JP | 2005-222896 | 8/2005 |
| WO | WO 98/45907 | 10/1998 |

OTHER PUBLICATIONS

Office Action mailed Jan. 31, 2012, in Japanese Patent Application No. 2008-259984.

U.S. Office Action mailed Oct. 29, 2010 in U.S. Appl. No. 11/836,310.

Office Action issued Feb. 22, 2011, in Taiwan Patent Application No. 096130040.

U.S. Office Action mailed Oct. 24, 2011 in U.S. Appl. No. 13/116,781.

Office Action issued Nov. 12, 2013 in Japanese Patent Application No. 2012-158432.

Office Action issued Oct. 1, 2013 in Japanese Patent Application No. 2012-043217.

US 8,790,807 B2

BATTERY DEVICE, ELECTRONIC APPARATUS, AND BATTERY SYSTEM

CROSS REFERENCES TO RELATED APPLICATIONS

The present application is a continuation application of and claims the benefit of priority under 35 U.S.C. §120 from U.S. application Ser. No. 13/458,601, now U.S. Pat. No. 8,470,465, filed Apr. 27, 2012, which is a continuation application of U.S. application Ser. No. 13/116,781, now U.S. Pat. No. 8,241,774, filed May 26, 2011, which is a continuation application of U.S. application Ser. No. 11/836,310, now U.S. Pat. No. 7,989,101, filed Aug. 9, 2007, which is based upon and claims the benefit of priority under 35 U.S.C. §119 from prior Japanese Patent Application JP 2006-230797, filed in the Japanese Patent Office on Aug. 28, 2006. The entire contents of each of the above is incorporated herein by reference.

BACKGROUND OF THE INVENTION

1. Field of the Invention

The present invention relates to a battery device used as a portable power source, an electronic apparatus in which the battery device is detachably mounted and used, and a battery system including a combination of the electronic apparatus with the battery device.

2. Description of the Related Art

Japanese Unexamined Patent Application Publication No. 2000-243365 discloses an example of a battery device of the related art as a portable power source. Japanese Unexamined Patent Application Publication No. 2000-243365 discloses a battery pack in which a rechargeable battery cell used as a power source for an electronic apparatus is stored; a battery mounting device on which the battery pack is mounted; and an electronic apparatus including a battery mounting mechanism on which the battery pack is mounted. The battery pack disclosed in Japanese Unexamined Patent Application Publication No. 2000-243365 includes "a battery cell; a case in which the battery cell is stored; an output terminal which is provided in the case and outputs power of the battery cell; and a second surface of the case which is provided continuously with a first surface of the case having the output terminal and provided approximately perpendicular to the first surface, where a recess is formed with a plurality of steps in an approximate center of the second surface".

It may be expected that the battery pack having such a configuration may be prevented from being inappropriately mounted on a battery mounting device which is supposed to be incompatible (paragraph [0161] of the specification), for example.

Japanese Unexamined Utility Model Application Publication No. 2005-190929 discloses another example of a battery device of the related art. Japanese Unexamined Utility Model Application Publication No. 2005-190929 discloses a battery device and an electronic apparatus operated using the battery device. The battery device disclosed in Japanese Unexamined Utility Model Application Publication No. 2005-190929 includes "a case having a width, a thickness, and a length; a rechargeable battery provided in the case; and a battery side terminal provided on a surface of the case and connected to the rechargeable battery, where the battery device is inserted in the length direction into a battery housing chamber of an electronic apparatus and the battery side terminal is connected to a housing chamber side terminal of the battery housing chamber. A guide groove is formed in each side of the case in the crosswise direction, where the guide groove extends in the length direction and is engaged with a protrusion provided in the battery housing chamber to position the case in the thickness direction in the battery housing chamber".

According to the battery device having such a configuration, it may be expected that "since a guide groove is formed in each side of the case in the crosswise direction of the battery device, where the guide groove extends in the length direction and is engaged with a protrusion provided in the battery housing chamber to position the case in the thickness direction in the battery housing chamber, it is possible to store, in the battery housing chamber, multiple types of battery devices different in thickness of the case, that is, different in volume" (paragraph [0005] of the specification).

However, in the battery device disclosed in Japanese Unexamined Patent Application Publication No. 2000-243365, a recess formed with a plurality of steps is provided in an approximate center of a rear surface of the case in which the battery cell is stored, and a protrusion corresponding to a shape of the recess is provided in a mounting portion of the electronic apparatus in which the battery device is mounted, in order to discriminate a type of the battery device. As a result, when a new battery device is developed, it may be necessary to increase the number of the steps in the recess of the battery device and provide a protrusion corresponding to the recess in the mounting portion of the electronic apparatus, and thus the recess of the battery device and the protrusion of the mounting portion have complicated shapes.

Further, each of the battery devices disclosed in Japanese Unexamined Patent Application Publication No. 2000-243365 and Japanese Unexamined Patent Application Publication No. 2005-190929 is formed as an exclusive component that may be mounted only on a mounting portion having a specific configuration of an electronic apparatus. Accordingly, one battery device may be mounted on an electronic apparatus having a mounting portion corresponding to the battery device, and a battery device corresponding to the electronic apparatus may separately be prepared for another type of an electronic apparatus including a mounting portion having a different mounting structure.

SUMMARY OF THE INVENTION

The number of steps in a recess of the battery device may have to be increased and provided a protrusion corresponding to the recess in a mounting portion of an electronic apparatus when a new battery device of the related art is developed, and thus the recess of the battery device and the protrusion of the mounting portion have complicated shapes.

A battery device according to an embodiment of the present invention includes an approximately rectangular parallelepiped battery enclosure incorporating a battery cell; and an output terminal which is placed to expose an output portion in an approximate center of at least a first surface of the battery enclosure in a crosswise direction and outputs power of the battery cell. The battery enclosure has a second surface, a first step surface, a second step surface, a first engaging portion, a second engaging portion, a first groove, and a second groove. The second surface is approximately perpendicular to the first surface. The first step surface is provided continuously with and approximately parallel to the second surface with a predetermined step on one side of the second surface in the crosswise direction. The second step surface is provided continuously with and approximately parallel to the second surface with a predetermined step on the other side of the second surface in the crosswise direction. The first engaging portion protrudes with predetermined width and thickness from the second surface to one side in the crosswise direction. The second engaging portion protrudes with predetermined width and thickness from the second surface in the crosswise direction to the other side. The first groove is formed with the first step surface and the first engaging portion. The second groove is formed with the second step surface and the second engaging portion. The most important feature is that a recess is provided in at least one of the first step surface and the second step surface.

An electronic apparatus according to an embodiment of the present invention includes a mounting portion in which a battery device is detachably mounted having an approximately rectangular parallelepiped battery enclosure incorporating a battery cell; and a connection terminal which is placed to expose a connection portion in an approximate center of at least a first surface of the mounting portion in a crosswise direction and is detachably connected to an output terminal that outputs power of the battery cell of the battery device. The mounting portion of the electronic apparatus has a second surface approximately perpendicular to the first surface; a first hook provided at a predetermined interval from the second surface and detachably engaged with a first engaging portion provided in the battery enclosure; and a second hook provided at a predetermined interval from the second surface and detachably engaged with a second engaging portion provided in the battery enclosure. A projection protruding away from the second surface is provided on at least one of the first hook and the second hook.

According to an embodiment of the present invention, there is provided a battery system including a combination of a battery device having a battery cell with an electronic apparatus having a mounting portion in which the battery device is detachably mounted.

The battery device has an approximately rectangular parallelepiped battery enclosure incorporating a battery cell; and an output terminal which is placed to expose an output portion in an approximate center in a crosswise direction of at least a battery side first surface of the battery enclosure and outputs power of the battery cell. The battery enclosure of the battery device has a battery side second surface, a first step surface, a second step surface, a first engaging portion, a second engaging portion, a first groove, and a second groove. The battery side second surface is approximately perpendicular to the battery side first surface. The first step surface is provided continuously with and approximately parallel to the battery side second surface with a predetermined step on one side of the battery side second surface in the crosswise direction. The second step surface is provided continuously with and approximately parallel to the battery side second surface with a predetermined step on the other side of the battery side second surface in the crosswise direction. The first engaging portion protrudes with predetermined width and thickness to one side from the battery side second surface in the crosswise direction. The second engaging portion protrudes with predetermined width and thickness to the other side from the battery side second surface in the crosswise direction. The first groove is formed with the first step surface and the first engaging portion. The second groove is formed with the second step surface and the second engaging portion. A recess is provided in at least one of the first step surface and the second step surface.

The electronic apparatus has a connection terminal which is placed to expose a connection portion in an approximate center of at least an electronic apparatus side first surface of the mounting portion in a crosswise direction and is detachably connected to the output terminal that outputs power of the battery cell of the battery device. The mounting portion of the electronic apparatus has: an electronic apparatus side second surface approximately perpendicular to the electronic apparatus side first surface; a first hook provided at a predetermined interval from the electronic apparatus side second surface and detachably engaged with a first engaging portion provided in the battery enclosure; and a second hook provided at a predetermined interval from the electronic apparatus side second surface and detachably engaged with a second engaging portion provided in the battery enclosure. A projection detachably engaged with the recess is provided in at least one of the first hook and the second hook.

A battery device according to an embodiment of the present invention having such a configuration may provide a type discrimination portion for a new battery device with a simple structure and may be commonly used for multiple types of an electronic apparatus having different mounting systems. An electronic apparatus according to an embodiment of the present invention may provide a type discrimination portion for a new battery device with a simple structure, and a battery device mounted on a mounting portion of the electronic apparatus to supply power may be commonly used for multiple types of the electronic apparatus having different mounting systems. Further, a battery system according to an embodiment of the present invention including a combination of the battery device and the electronic apparatus described above may provide a battery system having advantages of the battery device and the electronic apparatus.

BRIEF DESCRIPTION OF THE DRAWINGS

FIG. 2A is a bottom view and FIG. 2B is a left side view.

FIG. 3A is a front view, FIG. 3B is a rear view, and FIG. 3C is a D-D line cross-sectional view of FIG. 2B.

FIG. 9A is a front view of the rear panel, FIG. 9B is a view describing an initial state during mounting a battery device, and FIG. 9C is view describing a state after mounting the battery device.

FIG. 11A is a front view of the rear panel, FIG. 11B is a view describing an initial state during mounting a battery device, and FIG. 11C is view describing a state after mounting the battery device.

DESCRIPTION OF THE PREFERRED EMBODIMENTS

A battery device, suitable electronic apparatus using the battery device, and a battery system including a combination of the battery device with the electronic apparatus are realized based on a simple structure, where a type of the battery device may be discriminated based on the simple structure, and there is no need to prepare separate battery devices for multiple types of an electronic apparatus having mounting portions with different structures and thus one battery device may be commonly used for the multiple types.

Figure 1:
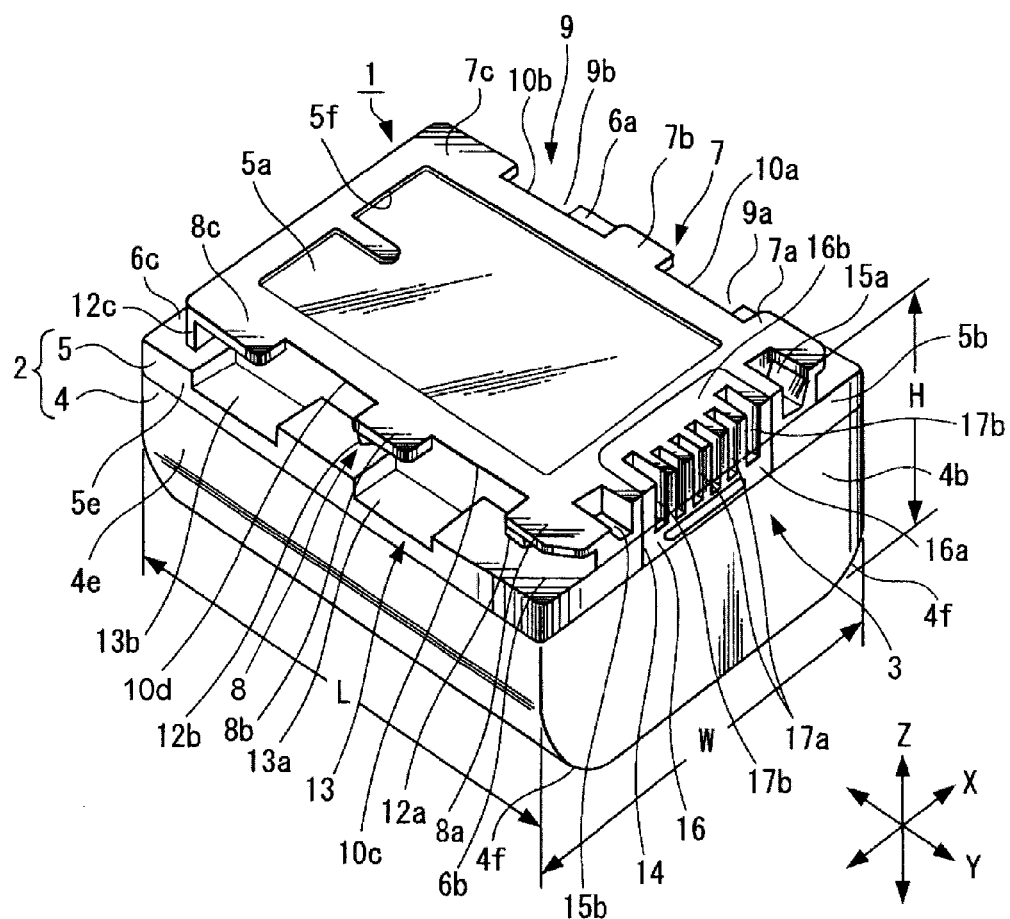
FIG. 1 is a bottom oblique view showing a first example of a battery device according to an embodiment of the present invention.
Figure 2A:
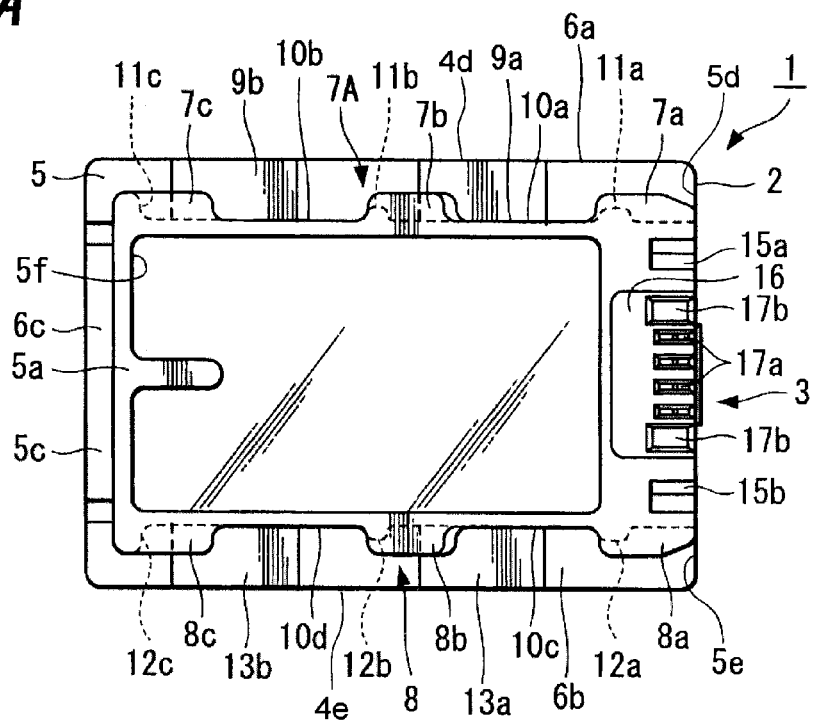
FIGS. 2A-2B show a first example of a battery device according to an embodiment of the present invention, where
Figure 2B:
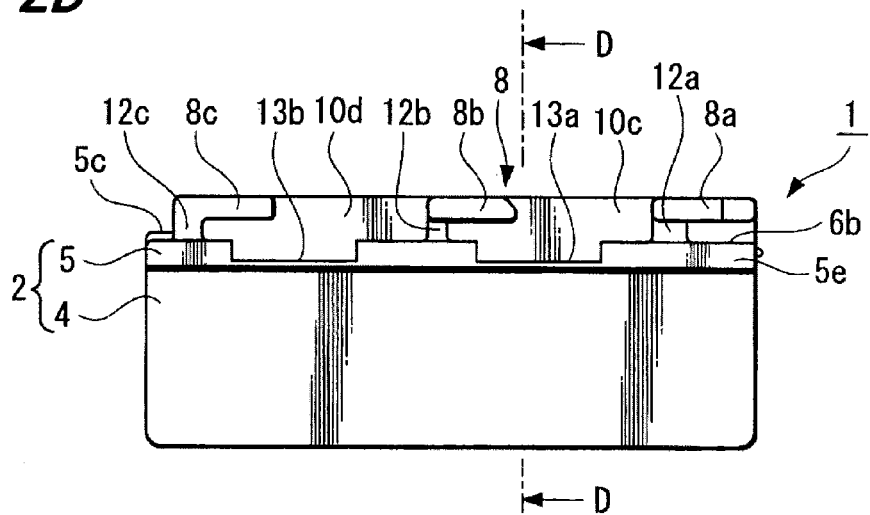
Figure 3A:
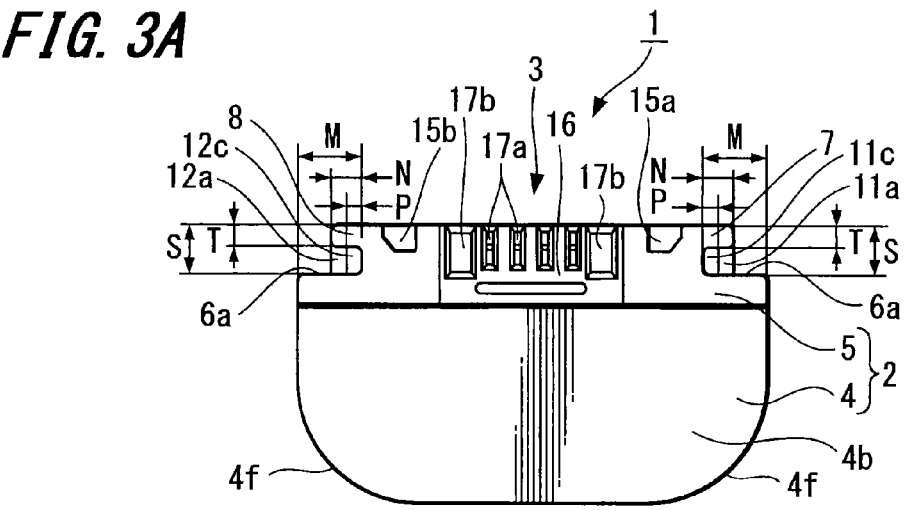
FIGS. 3A-3C show a first example of a battery device according to an embodiment of the present invention, where
Figure 3B:
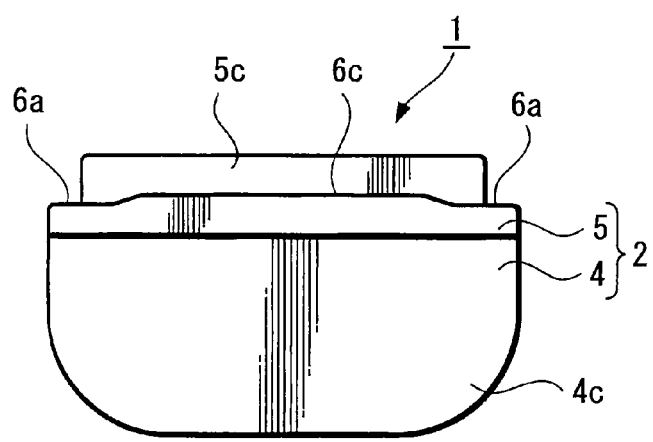
Figure 3C:
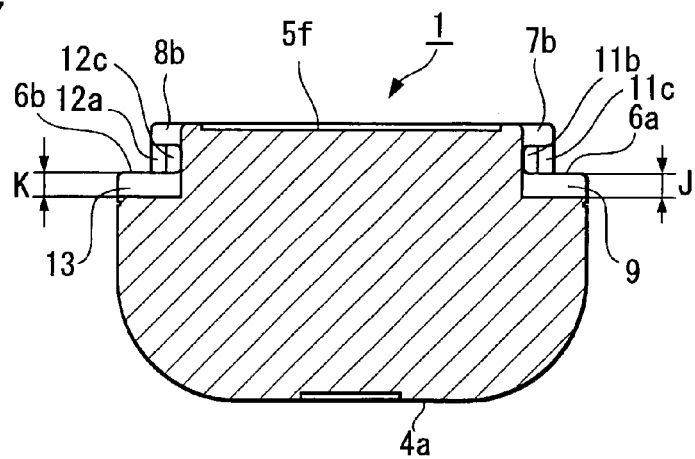
Figure 4:
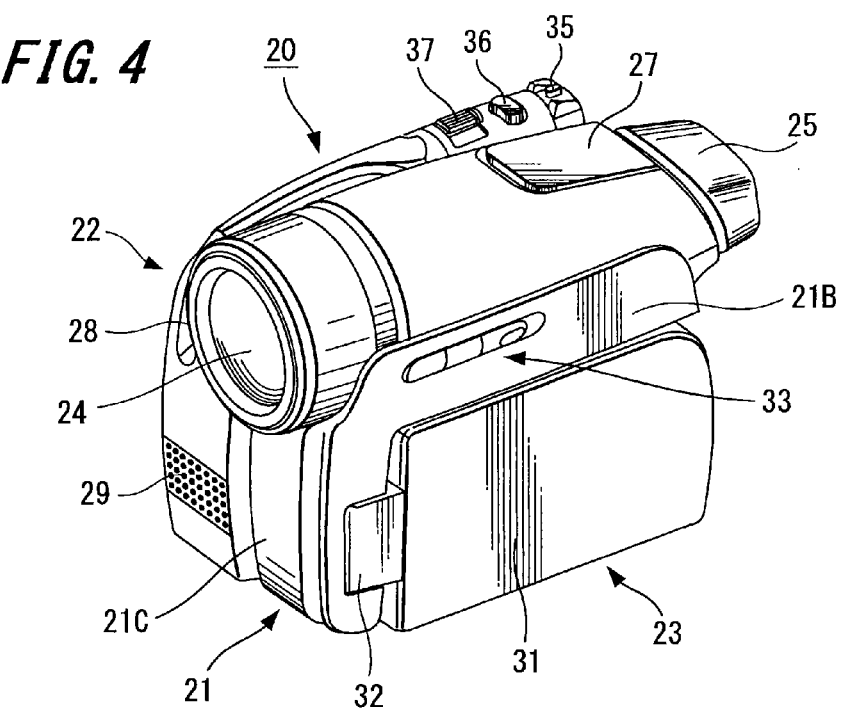
FIG. 4 is a front oblique view of a digital video camera as a specific example of an imaging device shown as an example of an electronic apparatus according to an embodiment of the present invention.
Figure 5:
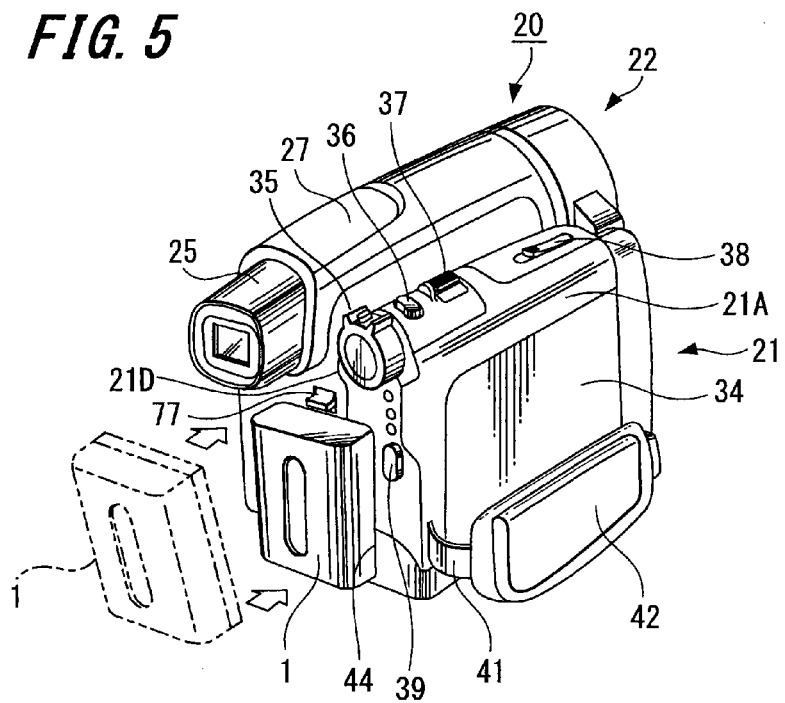
FIG. 5 is a rear oblique view of a digital video camera as a specific example of an imaging device shown as an example of an electronic apparatus according to an embodiment of the present invention.
Figure 6:
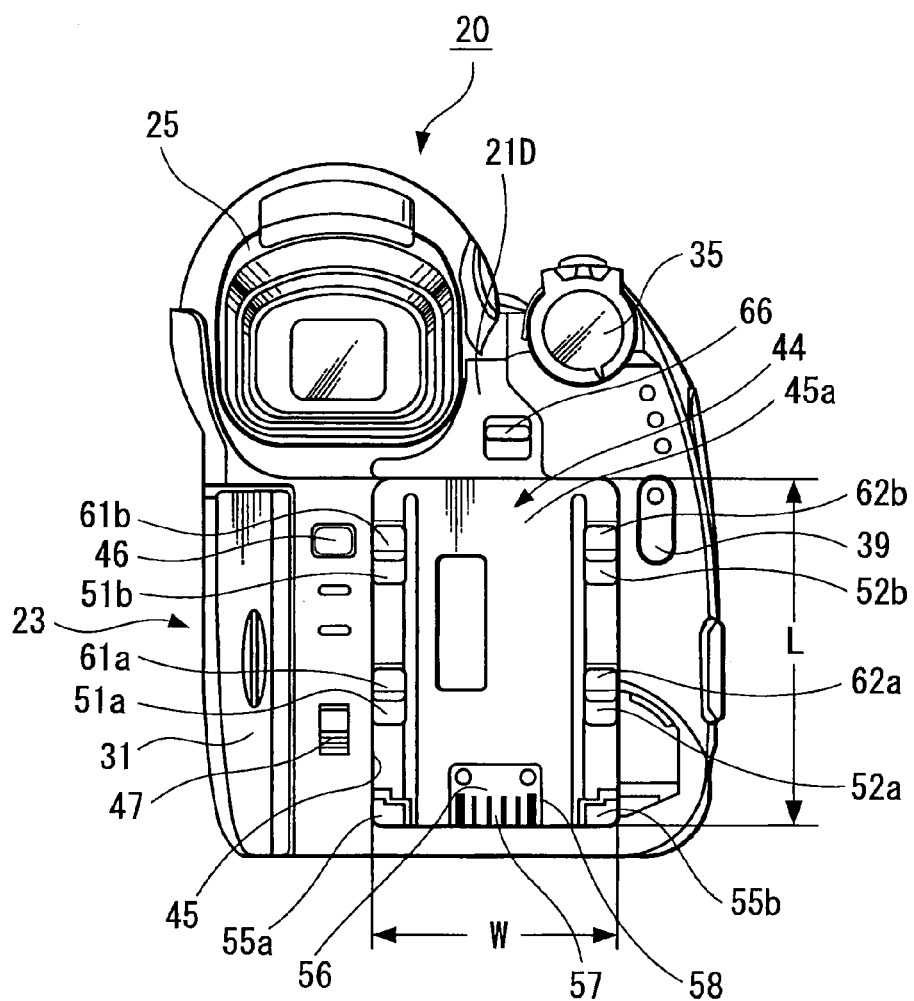
FIG. 6 is a rear view of a digital video camera as a specific example of an imaging device shown as an example of an electronic apparatus according to an embodiment of the present invention.
Figure 7:
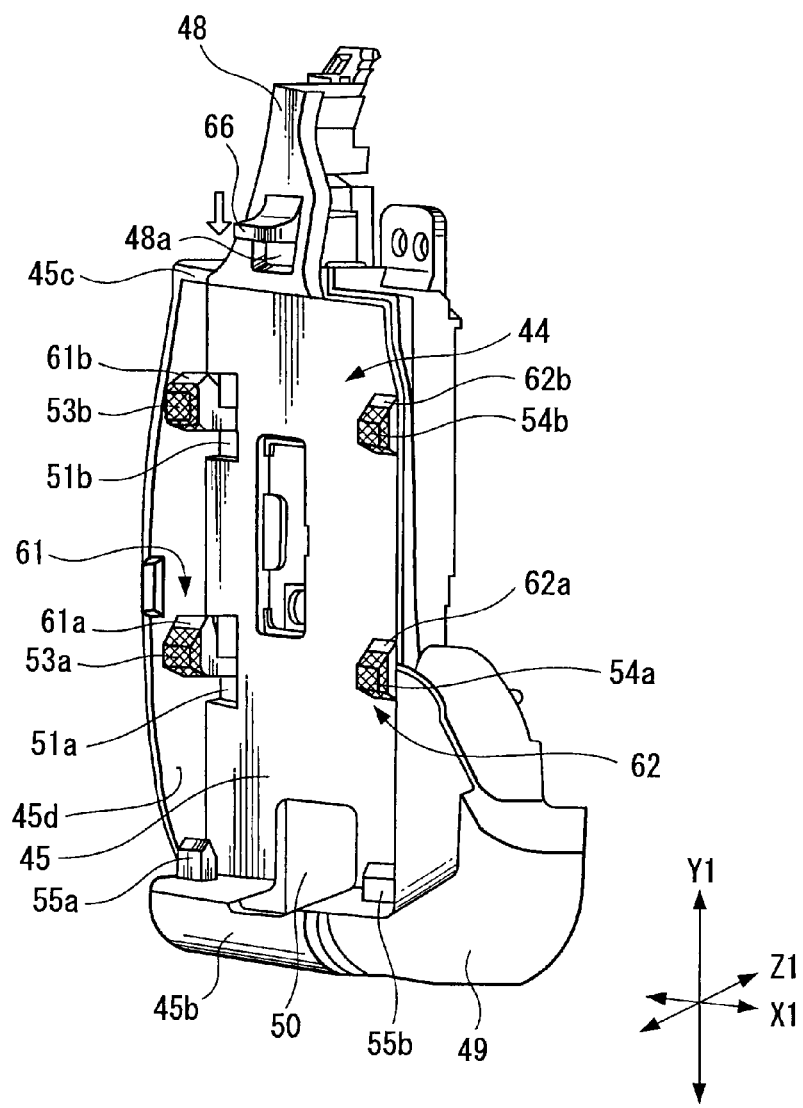
FIG. 7 is an oblique view of a rear panel having a mounting portion of the digital video camera shown in FIG. 4.
Figure 8:
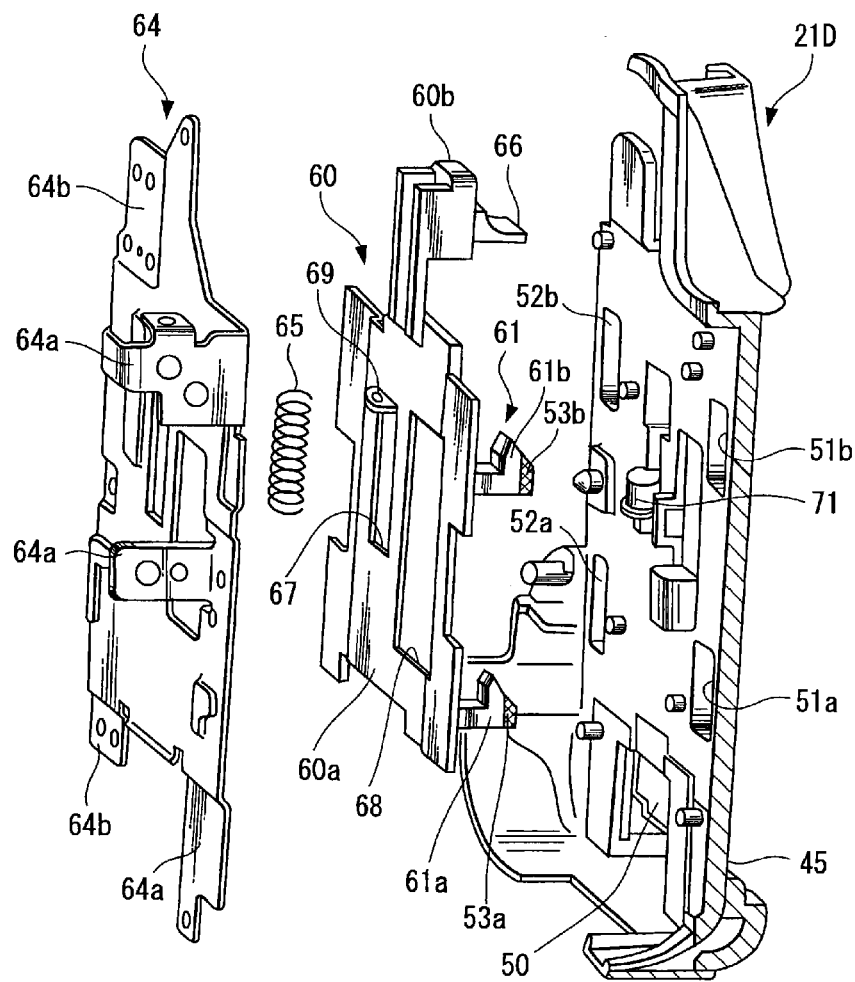
FIG. 8 is an exploded oblique view of a rear panel having a mounting portion, a slide member, and a support plate member of the digital video camera shown in FIG. 4.
Figure 9A:
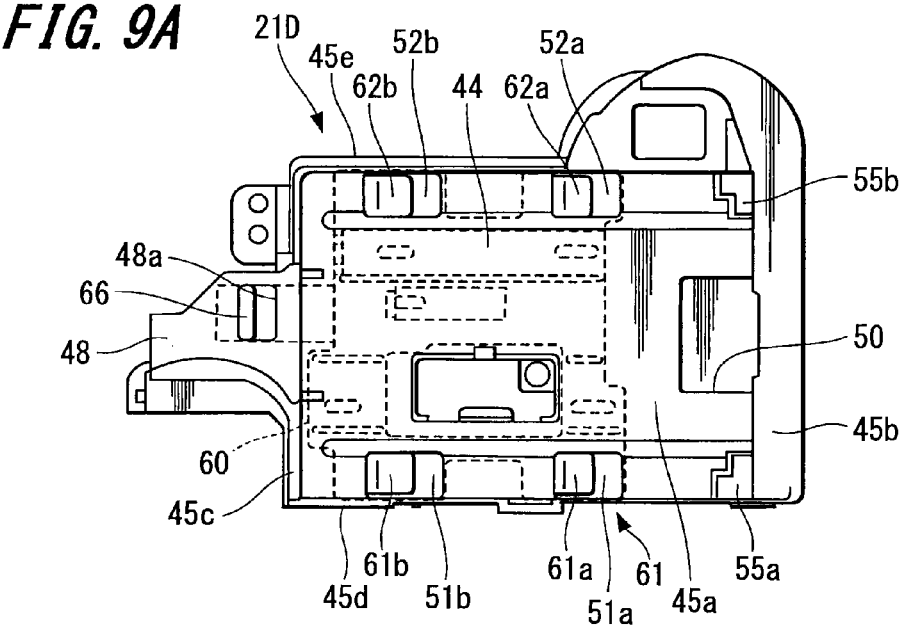
FIGS. 9A-9C show the rear panel shown in FIG. 7 and others, where
Figure 9B:
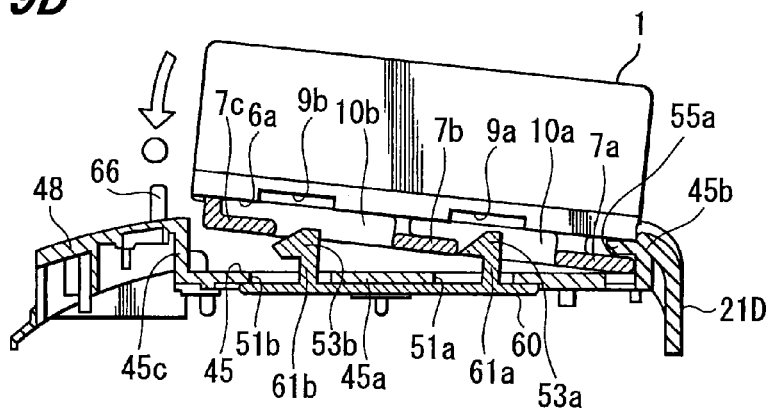
Figure 9C:
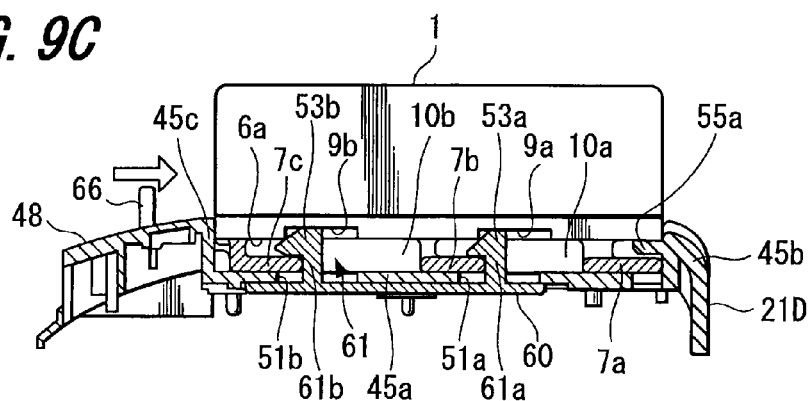
Figure 10:
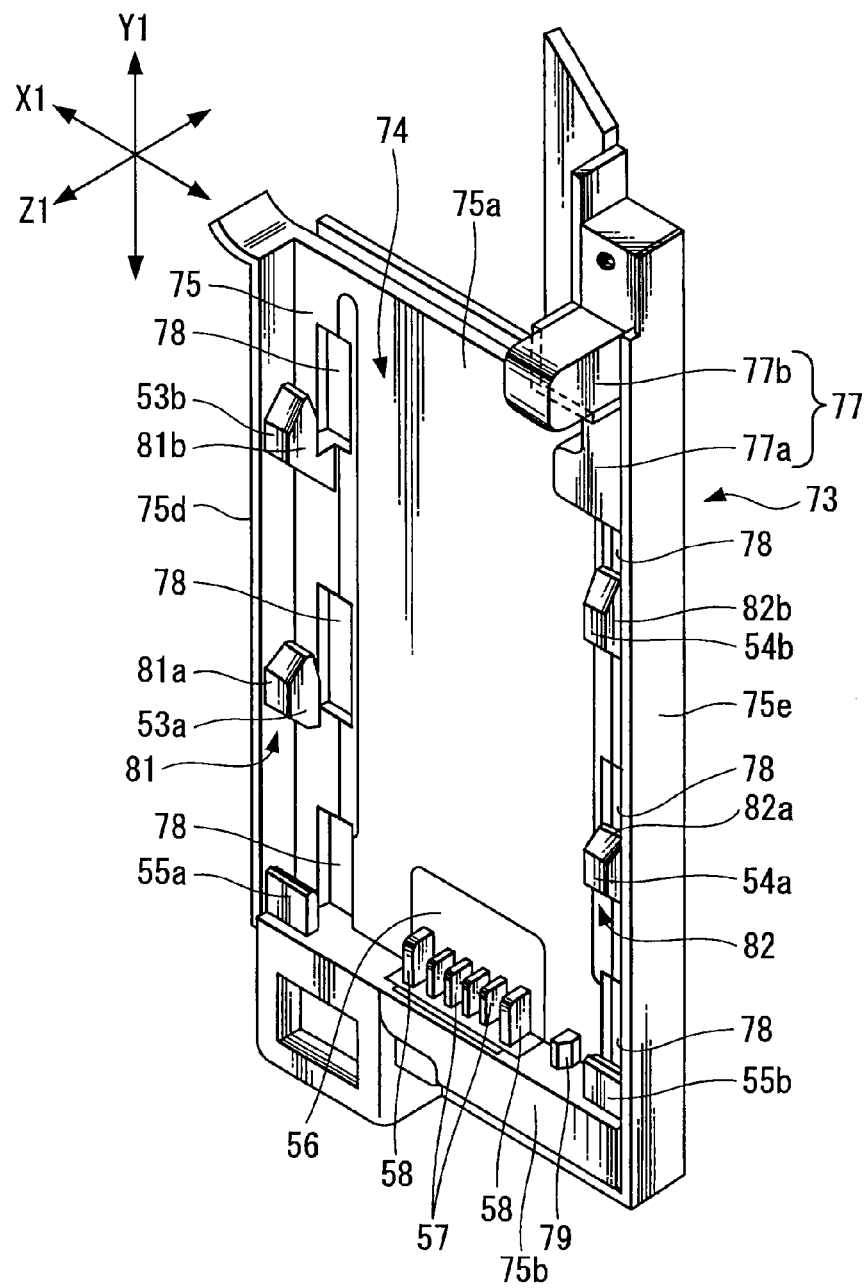
FIG. 10 is an oblique view showing a second example of a rear panel having a mounting portion of an imaging device shown as an example of an electronic apparatus according to an embodiment of the present invention.
Figure 11A:
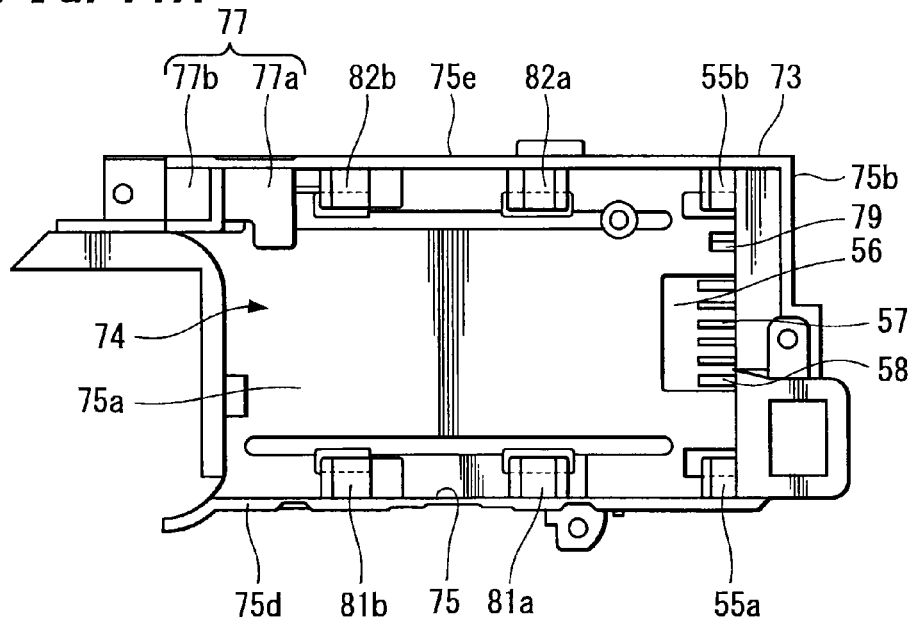
FIGS. 11A-11C show the rear panel shown in FIG. 10 and others, where
Figure 11B:
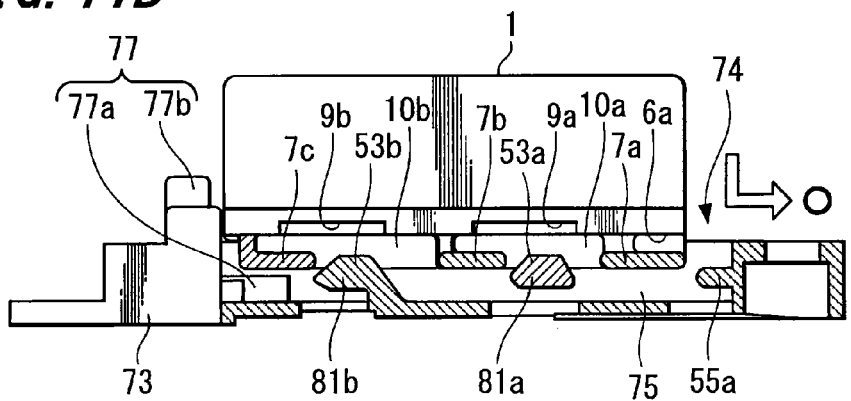
Figure 11C:
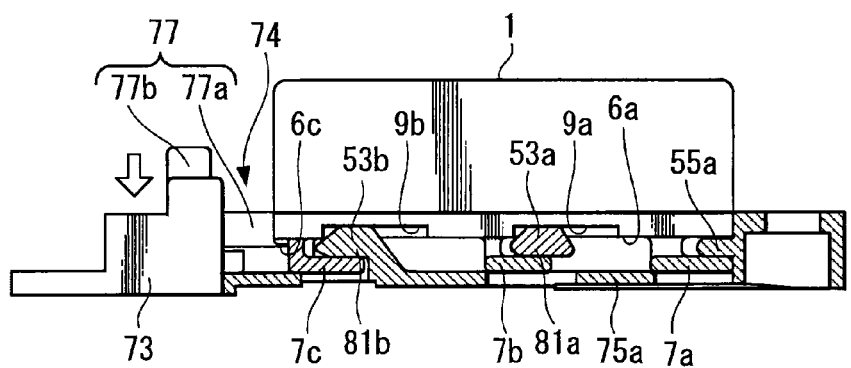

FIGS. 1 to 17 show examples of embodiments of the present invention. Specifically, FIGS. 1 to 3 show a first example of a battery device according to an embodiment of the present invention, where FIG. 1 is an oblique view, FIG. 2A is a bottom view, FIG. 2B is a left side view, FIG. 3A is a front view, FIG. 3B is a rear view, and FIG. 3C is a D-D line cross-sectional view of FIG. 2B. FIGS. 4 to 7 show an imaging device as an example of an electronic apparatus according to an embodiment of the present invention, where FIG. 4 is a front oblique view of the imaging device, FIG. 5 is a rear oblique view of the imaging device, FIG. 6 is a rear view of the imaging device, and FIG. 7 is an oblique view showing a first example of a rear panel of an exterior case. FIG. 8 is an exploded oblique view showing a mounting portion, a slide member, and a support plate member, and FIGS. 9A to 9C describe a state of mounting a battery device in a mounting portion of an imaging device, where FIG. 9A is a front view of a rear panel, FIG. 9B is a view describing an initial state during mounting the battery device, and FIG. 9C is a view describing a state after mounting the battery device. FIG. 10 is an oblique view showing a second example of a rear panel, and FIGS. 11A to 11C describe a state of mounting a battery device in a mounting portion of an imaging device, where FIG. 11A is a front view of the rear panel, FIG. 11B is a view describing an initial state during mounting the battery device, and FIG. 11C is a view describing a state after mounting the battery device.

Figure 12:
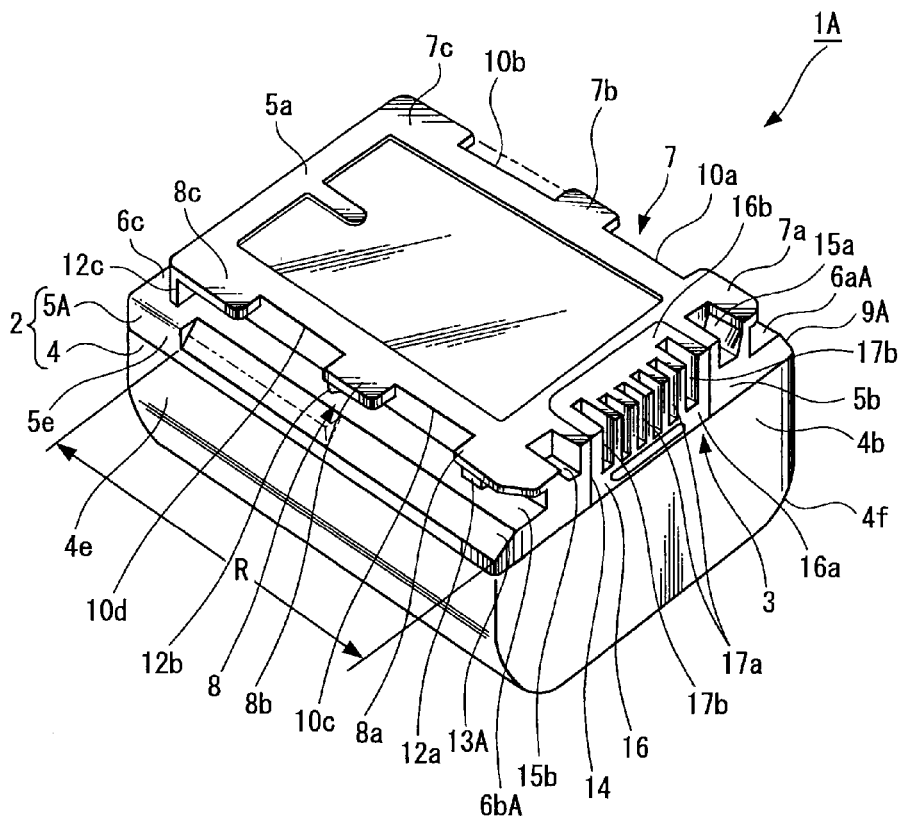
FIG. 12 is a bottom oblique view showing a second example of a battery device according to an embodiment of the present invention.
Figure 13:
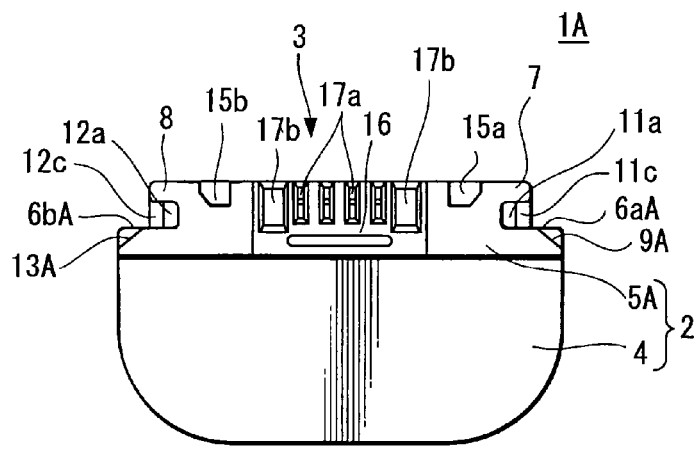
FIG. 13 is a front view showing a second example of a battery device according to an embodiment of the present invention.
Figure 14:
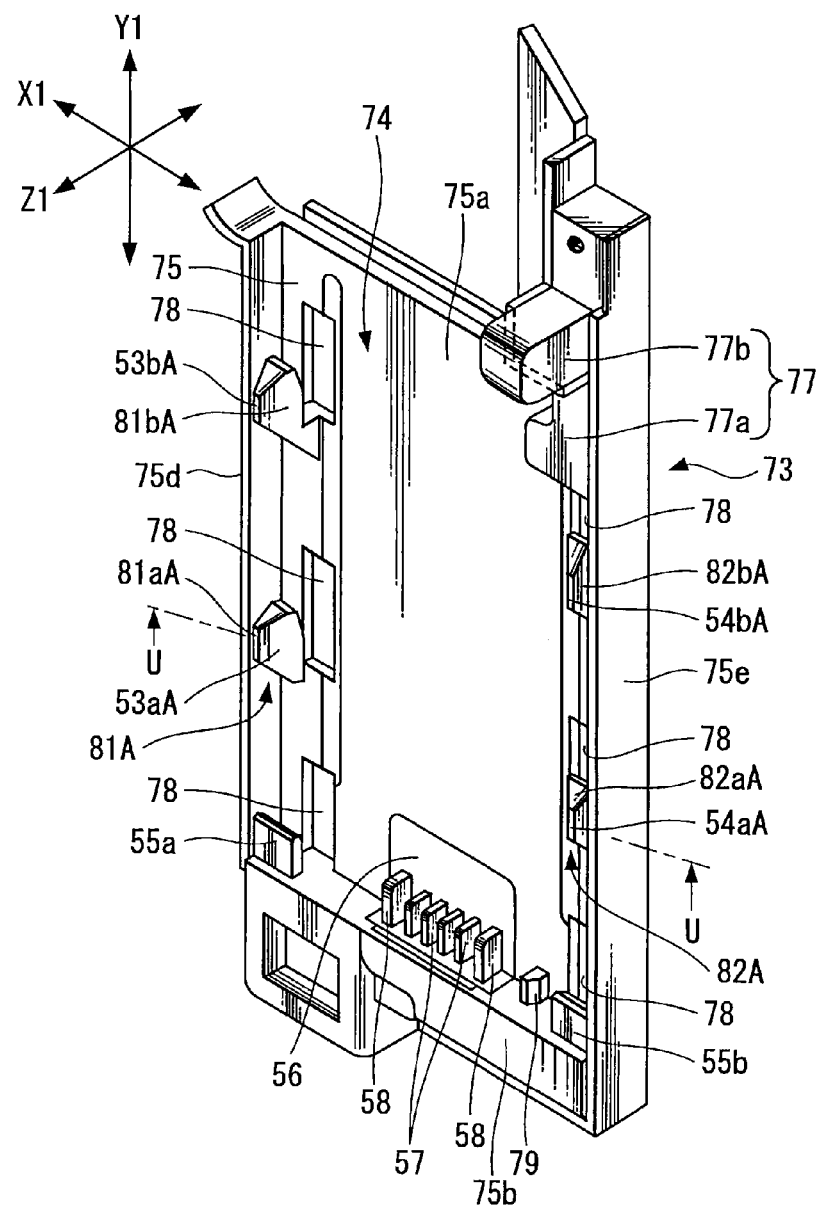
FIG. 14 is an oblique view showing a third example of a rear panel having a mounting portion of an imaging device shown as an example of an electronic apparatus according to an embodiment of the present invention.
Figure 15:
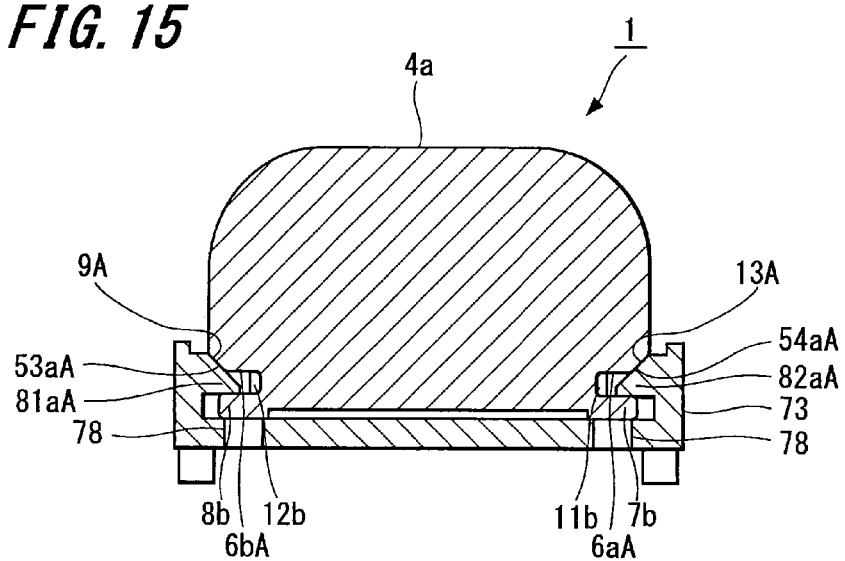
FIG. 15 is an U-U line cross-sectional view showing the rear panel shown in FIG. 14 and others in a state where a battery device is mounted.
Figure 16:
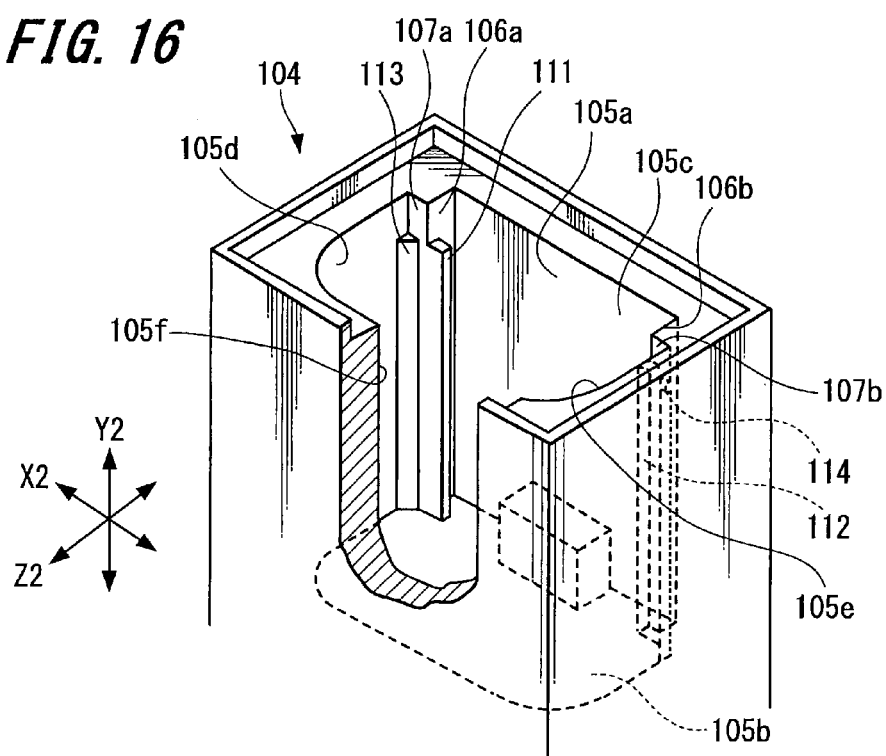
FIG. 16 is a front oblique view showing a fourth example of a mounting portion of an electronic apparatus according to an embodiment of the present invention.
Figure 17:
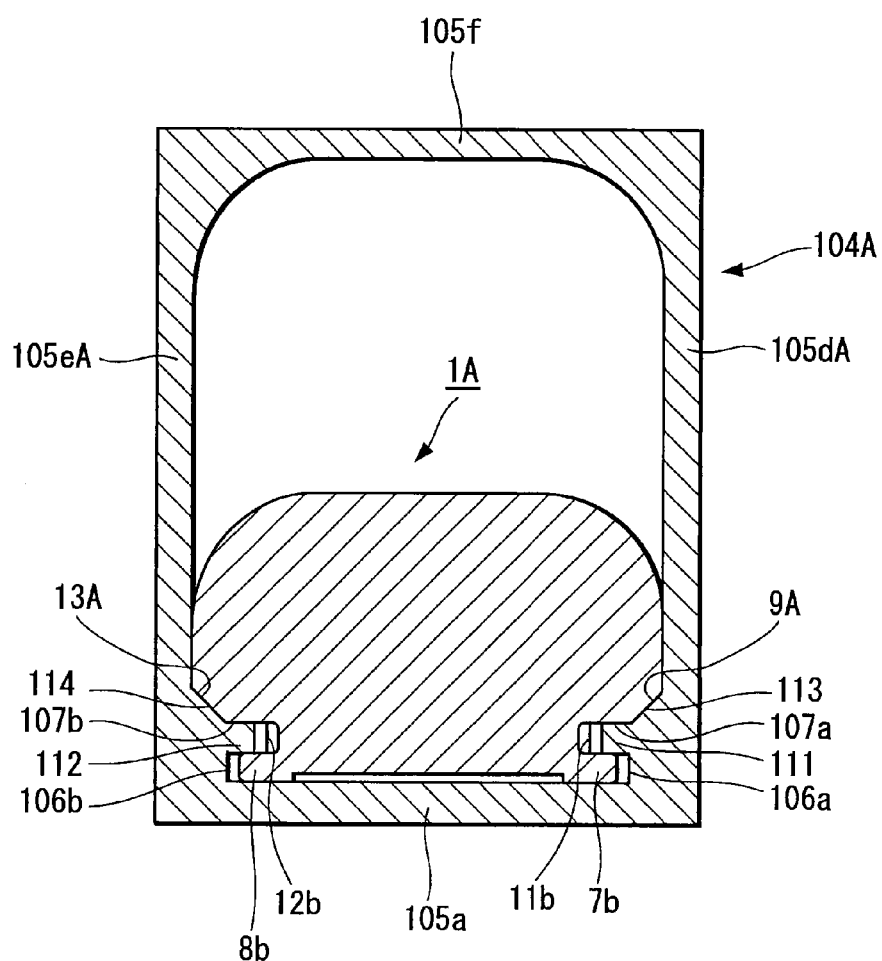
FIG. 17 is a cross-sectional view of a mounting portion of a fourth example in which a battery device is mounted, the mounting portion having a dimension in a height direction Z2 sufficiently larger than that of the battery device.

FIGS. 12 and 13 show a second example of a battery device according to an embodiment of the present invention, where FIG. 12 is an oblique view and FIG. 13 is a front view. FIG. 14 is an oblique view showing a third example of a rear panel, and FIG. 15 is an U-U line cross-sectional view of FIG. 14 in a state where a battery device is mounted. FIG. 16 is a front oblique view of a fourth example of a mounting portion of an electronic apparatus according to an embodiment of the present invention, and FIG. 17 is a view describing a mounting portion in which a battery device is mounted, the mounting portion having a dimension in a height direction Z2 sufficiently larger than that of the battery device.

Example 1

First, a first example of a battery device according to an embodiment of the present invention will be described with reference to FIGS. 1 to 3. The battery device 1 includes: a battery enclosure 2 formed with a hollow enclosure; a battery cell and a control circuit board (not shown) provided inside the battery enclosure 2; and a battery side output terminal 3 provided in the battery enclosure 2.

As shown in FIG. 1, the battery enclosure 2 shown in this example is formed as an approximately rectangular parallelepiped block-shaped container having a dimension L in a longitudinal direction Y, a dimension W in a crosswise direction X at right angles to the longitudinal direction Y, and a dimension H in a height direction Z at right angles to the longitudinal direction Y and the crosswise direction X. In this example, the dimensions of the battery enclosure 2 (length L, width W, and height H) are set to have a relation of: length L>width W>height H. However, a shape of a battery device according to an embodiment of the present invention is not limited to a shape of the battery device of this example, and the height H (for example, width W<height H) is sufficiently be increased, to allow the width W longer than the length L (length L<width W), and to use other variations in the dimensions, for example. The battery enclosure 2 is formed with a container-shaped upper case 4 with one surface open and a cover-shaped lower case 5 mounted to close the opening of the upper case 4.

The upper case 4 has a rectangular upper surface 4a, a front surface 4b, a rear surface 4c, a left side surface 4d, and a right side surface 4e. The front surface 4b is continuous with the upper surface 4a to be approximately perpendicular to one side Y of the upper surface 4a in the longitudinal direction. The rear surface 4c is continuous with the upper surface 4a to be approximately perpendicular to the other side Y of the upper surface 4a in the longitudinal direction. The left side surface 4d is continuous with the upper surface 4a to be approximately perpendicular to one side of the upper surface 4a in the crosswise direction X. The right side surface 4e is continuous with the upper surface 4a to be approximately perpendicular to the other side of the upper surface 4a in the crosswise direction X. Circular chamfers 4f, 4f each having a large radius of curvature are provided in a corner at which the upper surface 4a intersects with the left side surface 4d and a corner at which the upper surface 4a intersects with the right side surface 4e, respectively.

The lower case 5 is formed with a lower surface 5a, a front surface 5b, a rear surface 5c, a left step portion 5d, and a right step portion 5e. The lower surface 5a is approximately rectangular and shows a specific example of a second surface of the battery enclosure 2. The front surface 5b forms part of a first surface continuous with the lower surface 5a to be approximately perpendicular to one side of the lower surface 5a in the longitudinal direction Y. The rear surface 5c has a third step surface 6c continuous with the lower surface 5a with a predetermined step from the other side in the longitudinal direction Y of the lower surface 5a. The left step portion 5d has a first step surface 6a continuous with the lower surface 5a with a predetermined step from one side of the lower surface 5a in the crosswise direction X. The right step portion 5e has a second step surface 6b continuous with the lower surface 5a with a predetermined step from the other side of the lower surface 5a in the crosswise direction X. The front surface 5b of the lower case 5 and the front surface 4b of the upper case 4 form a front surface that is the first surface of the battery enclosure 2.

An application portion 5f for application of a label is formed to have an appropriate depth on the lower surface 5a of the lower case 5. As shown in FIG. 3A, the first step surface 6a and the second step surface 6b are set to have an approximately equal height S (length in the height direction Z) from the lower surface 5a. Further, the first step surface 6a and the second step surface 6b are also set to have an approximately equal width M (length in the crosswise direction X). The first step surface 6a and the second step surface 6b are formed to be approximately parallel to the lower surface 5a, respectively.

Further, as shown in FIG. 1A, a first engaging portion 7 and a second engaging portion 8 are provided in the lower case 5, where the first engaging portion 7 is formed protruding from one side of the lower surface 5a with predetermined width N and thickness T in the crosswise direction X that is the second surface, and the second engaging portion 8 is formed protruding with predetermined width N and thickness T from the other side of the lower surface 5a in the crosswise direction X. The first engaging portion 7 and the second engaging portion 8 are symmetrical with each other, and the width (protrusion length) N of each of the first engaging portion 7 and the second engaging portion 8 is set to be about ½ the width M of each of the first step surface 6a and the second step surface 6b. The thickness T of each of the first engaging portion 7 and the second engaging portion 8 is set to be ½ or less the height S of each of the first step surface 6a and the second step surface 6b.

The first engaging portion 7 has a first engaging piece 7a, a second engaging piece 7b, and a third engaging piece 7c provided at appropriate intervals in the longitudinal direction Y. The first engaging portion 7a is placed on a front surface 5b side, the third engaging portion 7c is placed on a rear surface 5c side, and the second engaging portion 7b is placed in a middle between the first engaging portion 7a and the third engaging portion 7c. A first opening 10a is provided between the first engaging piece 7a and the second engaging piece 7b, and a second opening 10b is provided between the second engaging piece 7b and the third engaging piece 7c. Similarly, the second engaging portion 8 has a first engaging piece 8a, a second engaging piece 8b, and a third engaging piece 8c provided at appropriate intervals in the longitudinal direction Y. The first engaging portion 8a is placed on a front surface 5b side, the third engaging portion 8c is placed on a rear surface 5c side, and the second engaging portion 8b is placed in a middle between the first engaging portion 8a and the third engaging portion 8c. A third opening 10c is provided between the first engaging piece 8a and the second engaging piece 8b, and a fourth opening 10d is provided between the second engaging piece 8b and the third engaging piece 8c.

Further, as shown in FIGS. 2 and 2A, a first rib 11a is provided on a rear surface 5c side of the first engaging piece 7a of the first engaging portion 7; a second rib 11b is provided on a rear surface 5c side of the second engaging piece 7b; and a third rib 11c is provided on a rear surface 5c side of the third engaging piece 7c. Similarly, a first rib 12a is provided on a rear surface 5c side of the first engaging piece 8a of the second engaging portion 8; a second rib 12b is provided on a rear surface 5c side of the second engaging piece 8b; and a third rib 12c is provided on a rear surface 5c side of the third engaging piece 8c. A protrusion length (width) P of each of the first ribs 11a, 12a and the second ribs 11b, 12b is set to be about ½ a protrusion length (width) N of each of the first engaging pieces 7a, 8a and the second engaging pieces 7b, 8b. On the other hand, a protrusion length (width) of each of the third ribs 11c, 12c is set to be approximately equal to a protrusion length (width) N of each of the third engaging pieces 7c, 8c.

An opening 14 for the output terminal 3 to expose part of the output terminal 3 is provided on a front surface 5b side of the lower case 5. The opening 14 is formed as a continuous notch from the front surface 5b to the lower surface 5a and is provided to notch a whole approximate center of the front surface 5b in the crosswise direction X. Further, two first discrimination recesses 15a, 15b to discriminate a type of the battery device 1 are provided on both sides of the opening 14 of the lower case 5 in the crosswise direction X. The two first discrimination recesses 15a, 15b are each formed to have a specific shape according to a shape, a power capacity, or the like of the battery device 1.

As shown in FIGS. 1 and 2B, two second discrimination recesses 9a, 9b to discriminate a type of the battery device 1 are provided on the first step surface 6a at a predetermined interval in the longitudinal direction Y. Similarly, two third discrimination recesses 13a, 13b to discriminate a type of the battery device 1 are provided on the second step surface 6b at a predetermined interval in the longitudinal direction Y. The second discrimination recesses 9a, 9b are each formed to have a specific depth (height) K from the first step surface 6a and the third discrimination recesses 13a, 13b are each formed to have a specific depth (height) J from the second step surface 6b according to a shape, a power capacity, and others of the battery device 1. In this example, the second discrimination recesses 9a, 9b and the third discrimination recesses 13a, 13b are approximately symmetrically formed so that the depth K is approximately equal to the depth J. However, the depth K of the second discrimination recesses 9a, 9b and the depth J of the third discrimination recesses 13a, 13b in an embodiment of the present invention are not limited to those in this example, and the second discrimination recesses 9a, 9b and the third discrimination recesses 13a, 13b may be asymmetrically formed to make the depth K differ from the depth J.

In this example, the number of the second discrimination recesses 9 or the third discrimination recesses 13 is set to be two. However, the number of the second discrimination recesses 9 or the third discrimination recesses 13 is not limited to the number in this example, and the number of the second discrimination recesses 9 may be one and the number of the third discrimination recesses 13 may be three, for example. Further, in this example, the second discrimination recesses 9 and the third discrimination recesses 13 are formed in each of the first step surface 6a and the second step surface 6b; however, it is also possible to form the second discrimination recesses 9 or the third discrimination recesses 13 on either one of the first step surface 6a and the second step surface 6b. The second discrimination recesses 9a, 9b and the third discrimination recesses 13a, 13b show a specific example of a recess in an embodiment of the present invention.

As shown in FIGS. 1 and 3A, the output terminal 3 mounted on the opening 14 of the lower case 5 has a block-shaped terminal holder 16 having at least: a front surface 16 coplanar with the front surface 5b of the lower case 5; and a lower surface 16b approximately perpendicular to the front surface 16a and coplanar with the lower surface 5a of the lower case 5. The terminal holder 16 has: multiple (four in this example) electrode slits 17a, 17a in which electrodes are placed; and two positioning slits 17b, 17b placed on both sides of the multiple electrode slits 17a. The electrode slits 17a and the positioning slits 17b are formed in a corner of the terminal holder 16 as groove-shaped notches continuous from the front surface to the bottom surface.

Positioning protrusions of a connection terminal 56 provided in a mounting portion of an electronic apparatus described later are each engaged with the two positioning slits 17b of the terminal holder 16. Similarly, electrodes of the connection terminal 56 are each engaged with the four electrode slits 17a. Battery side electrodes of the output terminal 3 (not shown) are each placed in the four electrode slits 17a. The battery cell incorporated in the battery enclosure 2 is electrically connected to each of the battery side electrodes of the output terminal 3.

The lower case 5 having such a configuration is overlapped with the upper case 4 to close an opening of the upper case 5 and portions overlapped in this manner are joined together. Obviously, the portions may be joined together by use of an adhesive, by thermally welding, or by another joining method, for example. Accordingly, the battery enclosure 2 is formed having the upper case 4 and the lower case 5 integrated. A battery cell having one or more battery cells and a control circuit board having a microcomputer including a CPU, a RAM and ROM, and an interface are stored in the battery enclosure 2. The battery cell and the control circuit board are electrically connected to each other and also connected to the output terminal 3. The output terminal 3 is formed so that power of the battery cell may be output and data of information on a battery capacity, a property, and others may be communicated between the output terminal 3 and external electronic apparatus. The battery device 1 is formed in this manner.

Next, a first example of an imaging device included in suitable electronic apparatus using the battery device 1 as a portable power source will be described with reference to FIGS. 4 to 6. The device shown in FIGS. 4 to 6 is a digital video camera 20 used as a first example of an imaging device. The digital video camera 20 includes a tape cassette having a magnetic tape as an information storage medium and converts an optical image into electric signals using an imaging element (such as a CCD (charge coupled device) or a CMOS image sensor) showing a specific example of an imaging mechanism, so that the image information may be recorded in the magnetic tape and displayed in a display device 23 formed with a flat panel such as a liquid crystal display.

However, an information storage medium used in an imaging device showing a specific example of an electronic apparatus according to an embodiment of the present invention is not limited to the magnetic tape shown in this example. It is possible to use disc-shaped recording media such as recordable optical discs, magneto-optical discs, and magnetic discs including DVD-Rs, DVD-RWs, DVD-RAMS, MOs, and FDs as information storage media. An electronic apparatus using such a disc-shaped recording medium may be realized as an optical disc video camera when using an optical disc; or a magneto-optical disc still camera when using a magneto-optical disc, for example. Further, such an electronic apparatus may be realized as a magnetic disc electronic organizer when using a magnetic disc.

The digital video camera 20 has: an exterior case 21 showing a specific example of a case main body formed with an enclosure forming an appearance; a tape drive device that is stored in the exterior case 21 and drives a magnetic tape of a tape cassette detachably mounted on the tape drive device to record (write) and reproduce (read) information signals; a control circuit to control driving of the tape drive device; a lens device 22 to incorporate a subject image as light to guide the image to the imaging device; and a display device rotatably attached to the exterior case 21.

As shown in FIGS. 4 to 6, the exterior case 21 is formed with a hollow enclosure and formed in an approximately rectangular parallelepiped shape by a driving device side panel 21A and a display device side panel 21B placed opposite to each other in a transverse direction; a front panel 21C to close a front opening of an enclosure formed with combining both panels; and a rear panel 21D to close a rear opening of the enclosure. The exterior case 21 has a longitudinal direction Y set to be a back-and-forth direction and is used as raised in a crosswise direction X. A lens device 22 is provided in an upper portion of the exterior case 21 in a state where a subjective lens 24 as an imaging lens of a lens system is exposed on a front surface.

The lens device 22 is attached to the exterior case 21 in a state where an optical axis of the lens system is in a horizontal direction. An imaging element (not shown) is attached to a rear portion of the lens device 22 in the exterior case 21. A view finder device 25 is placed behind the lens device 22 to reflect a subject image input from the lens device 22. An opening is provided in the upper portion of the external case 21 to expose an accessory shoe in which accessories such as a video light and an external microphone are detachably mounted. The accessory shoe is placed immediately in front of the view finder device 25 and usually detachably covered with a shoe cap 27 to open and close the opening. Further, a light emitting portion 28 of a flash device and an incorporated stereo-type microphone 29 are placed on the front panel 21C.

As shown in FIG. 4, the display device 23 is attached to a display device side panel 21B so that an attitude of the display device 23 may be modified. The display device 23 is formed with: a flat panel (not shown) formed with a flat liquid crystal display or the like; a panel case 31 in which the flat panel is stored; and a panel support 32 to support the panel case 31 so that an attitude of the panel case may be modified with respect to the display device side panel 21B. The panel support 32 has: a horizontal rotation portion to make the panel case 31 rotatable at about 90° in a horizontal direction with a vertical axis as a rotation center; and a back-and-forth rotation portion to make the panel case 31 rotatable at about 180° in a back-and-forth direction with a horizontal axis as a rotation center.

Accordingly, the display device 23 may be freely in a state where the flat panel is stored in a side surface of the display device side panel 21B; in a state where the flat panel faces backward by rotating the panel case 31 at 90° from that state; in a state where the flat panel faces forward by rotating the panel case 31 at 180° from that state; or in a state where the flat panel is in an intermediate position among these positions. A main body operation portion 33 formed with a plurality of operation buttons is provided on a side surface of the display device side panel 21B above the display device 23.

As shown in FIG. 5, a deck cover 34 to closably cover a tape deck in which the tape cassette is detachably mounted is closably provided on the driving device side panel 21A. The tape deck is a device to transport the mounted tape cassette to a predetermined position and to draw the magnetic tape from the cassette and load the tape on a rotation drum or the like of the tape drive device, and then allow the magnetic tape to run at a predetermined speed to record (write) and/or reproduce (read) information signals. The deck cover 34 to cover the tape deck has: a power source switch 35 also used as a mode selector switch; a shutter button 36 to photograph a static image; a zoom button 37 to continuously enlarge (tele) or reduce (wide) an image within a predetermined range; an opening/closing switch 38 to lock and unlock the deck cover 34; and a video recording button 39 to photograph a moving image.

The power source switch 35 has functions to switch the power source on and off by a rotation operation and to switch a plurality of function modes to each other to repeat them by performing a rotation operation with the power source switched on. Further, a hand belt 51 is attached to the deck cover 34 and a hand pad 42 is mounted on the hand belt 51. The hand belt 51 and the hand pat 42 support a hand of a user holding the exterior case 21 to prevent dropping of the digital video camera 20, for example.

As shown in FIGS. 5 and 6, a mounting portion 44 is provided on a rear surface of the exterior case 21 as a battery housing in which the battery device 1 as a portable power source is detachably mounted. The mounting portion 44 is placed lower than an approximate center of the rear surface of the exterior case 21, and is provided to open backward in the rear panel 21D forming the rear surface of the exterior case 21. The driving device side panel 21A is provided to the right of the rear panel 21D. The video recording button 39 is placed in the driving device side panel 21A. The display device side panel 21B is provided to the left of the rear panel 21D. A light emitting button 46 of the flash device and a night shot selector switch 47 are placed in the display device side panel 21B.

As shown in FIG. 7, the rear panel 21D is formed with a panel member formed longer in a vertical direction, and the mounting portion 44 formed with a recess is formed in one surface of the rear panel D. The mounting portion 44 has a rectangular opening 45 approximately as large as the battery device 1 (precisely, the mounting portion 44 has a length in a crosswise direction X1 approximately equal to that of the opening 45, but has a length in a longitudinal direction Y1 which is a length of the battery device 1 plus a length of a clearance to allow the battery device 1 to be stored in the opening 45 by rotating the battery device 1 with one edge in the longitudinal direction of the battery device as a rotation center).

The opening 45 has a bottom surface 45a, a lower surface 45b, an upper surface 45c, a left side surface 45d, and a right side surface 45e. The bottom surface 45a is rectangular and shows a specific example of a second surface of the mounting portion 44. The lower surface 45b is continuous with one side of the bottom surface 45a in the longitudinal direction Y1 and approximately perpendicular to the bottom surface 45a and shows a specific example of an electronic apparatus side first surface. The upper surface 45c is continuous with the other side in the longitudinal direction Y1 of the bottom surface 45a and approximately perpendicular to the bottom surface 45a. The left side surface 45d is continuous with one side in the crosswise direction X1 at right angles with the longitudinal direction Y1 of the bottom surface 45a and approximately perpendicular to the bottom surface 45a. The right side surface 45d is continuous with the other side in the crosswise direction X1 of the bottom surface 45a and approximately perpendicular to the bottom surface 45a. The opening 45 is provided with the longitudinal direction Y1 set to be a vertical direction.

Further, an upper facing 48 protruding upward is provided on the upper surface 45c, and an insertion hole 48a into which an operation projection 66 is inserted is provided on the upper facing 48. A lower facing 49 is provided to be continuously projected laterally and downward in a portion ranging from a lower portion of the right side surface 45e to the lower surface 45b. A fitting hole 50 to which a connection terminal 56 described later is fitted is provided in an approximate center of the lower surface 45b. The fitting hole 50 is formed as a notch continuously extending from the lower surface 45b to a middle of the bottom surface 45a.

There are provided, on the bottom surface 45a of the opening 45, two first penetration holes 51a, 51b into which a first hook 61 described later may penetrate and two second penetration holes 52a, 52b into which a second hook 62 may penetrate. The two first penetration holes 51a, 51b are provided along the left side surface 45d of the opening 45, where the first lower penetration hole 51a is placed at a predetermined interval from the lower surface 45b and the first upper penetration hole 51b is placed at a predetermined interval from the first lower penetration hole 51a. The two second penetration holes 52a, 52b are provided along the left side surface 45d of the opening 45, where the second lower penetration hole 52a is placed at a predetermined interval from the lower surface 45b and the second upper penetration hole 52b is placed at a predetermined interval from the second lower penetration hole 52a. The first penetration holes 51a, 51b and the second penetration holes 52a, 52b are provided symmetrically with each other. The first penetration holes 51a, 51b and the second penetration holes 52a, 52b are formed as rectangular holes extending in the longitudinal direction Y1 of the opening 45 so that a first hook 61 and a second hook 62 may be moved in a vertical direction at a predetermined distance, respectively.

Further, as shown in FIGS. 9A to 9C, the first lower penetration hole 51a is provided opposite to the first opening 10a placed between the first engaging piece 7a and the second engaging piece 7b of the first engaging portion 7 of the battery device 1 mounted on the mounting portion 44. Similarly, the second lower penetration hole 52a is provided opposite to the third opening 10c placed between the first engaging piece 8a and the second engaging piece 8b of the second engaging portion 8 of the battery device 1. The first upper penetration hole 51b is provided opposite to the second opening 10b placed between the second engaging piece 7b and the third engaging piece 7c of the first engaging portion 7 of the battery device 1. Similarly, the second upper penetration hole 52b is provided opposite to the fourth opening 10d placed between the second engaging piece 8b and the third engaging piece 8c of the second engaging portion 8 of the battery device 1.

Two protrusion pieces 55a, 55b to position and support engagement of the battery device 1 are provided on both corners on a lower edge of the opening 45. The two protrusion pieces 55a, 55b are formed with a predetermined clearance from the lower surface 45a to protrude upward from the lower surface 45b. When the battery device 1 is mounted, the first protrusion piece 55a is engaged with the first engaging piece 7a of the first engaging portion 7 of the battery device 1, and the second protrusion piece 55b is engaged with the first engaging piece 8a of the second engaging portion 8 of the battery device 1. A connection terminal 56 is provided in an approximate center between the first protrusion piece 55a and the second protrusion piece 55b, where the connection terminal is detachably connected to the output terminal 3 of the battery device 1 when the battery device 1 is mounted.

The connection terminal 56 has a shape and a structure corresponding to those of an output portion of the output terminal 3 of the battery device 1. Specifically, the connection terminal 56 has: four main body side electrodes 57 that are provided corresponding to the number of electrodes of the output terminal 3 and may be inserted into the four electrode slits 17a, respectively; and two guide pieces 58 that may be inserted into the two positioning slits 17b, 17b, respectively. The four main body side electrodes 57 are placed on the mounting portion 44 at equal predetermined intervals in the crosswise direction X1, and the two guide pieces 58 are provided outside the electrodes 57 at a predetermined interval.

As shown in FIG. 8, a slide member 60 is placed on a rear surface of the rear panel 21D having the mounting portion 44, and a support plate member 64 is placed on a rear surface of the slide member 60. The slide member 60 is supported with respect to the rear panel 21D slidably in a vertical direction that is the longitudinal direction Y1 in the mounting portion 44. The support plate member 64 is fixed to the rear panel 21D to prevent dropping of the slide member 60. A coil spring 65 showing a specific example of an energizing member to energize the slide member 60 away from the connection terminal 56 is present between the slide member 60 and the rear panel 21D.

The slide member 60 has: a base 60a formed with an approximately rectangular plate smaller than the bottom surface 45a of the opening 45; and an operation portion 60b provided protruding upward and continuously with an upper edge of the base 60a. The first hook 61 and the second hook 62 are provided at a predetermined interval between them on one surface of the base 60a. The first hook 61 is placed on one side of the base 60a in a crosswise direction X1, and the second hook 62 is placed on the other side of the base 60a in the crosswise direction X1. The first hook 61 is formed with a first hook piece 61a on a side remote from the operation portion 60b and a second hook piece 61b on a side close to the operation portion 60b. Similarly, the second hook 62 is formed with a first hook piece 62a on a side remote from the operation portion 60b and a second hook piece 62b on a side close to the operation portion 60b.

The two hook pieces 61a, 61b of the first hook 61 are placed in series on the base 60a in a longitudinal direction Y1; similarly, the two hook pieces 62a, 62b of the second hook 62 are placed in series on the base 60a in the longitudinal direction Y1. The four hook pieces 61a, 61b, 62a, 62b are symmetrically placed on the base 60a with respect to the longitudinal direction Y1. Further, nails protruding toward the operation portion 60b are provided on tops of the four hook pieces 61a to 62b, respectively. Each nail having an appropriate length extends approximately parallel to the base 60a. The four hook pieces 61a to 62b are slidably inserted from a rear surface side into the four penetration holes 51a, 51b, 52a, 52a of the rear panel 21D, respectively. Internal and external surfaces of a top of each nail of the four hook pieces 61a to 62b each preferably have an inclined plane having an appropriate size in order to facilitate engagement with and detachment from the first engaging portion 7 and the second engaging portion 8 of the battery device 1.

Further, first discrimination projections 53a, 53b and second discrimination projections 54a, 54b inserted into the second discrimination recesses 9a, 9b and the third discrimination recesses 13a, 13b of the battery device 1, respectively, are provided in the nails of the four hook pieces 61a to 62b, respectively. The four discrimination projections 53a to 54b are formed on one ends of the nails located away from the base 60a, respectively. The four discrimination projections 53a to 54b have a function to discriminate the first battery device 1 mountable in the mounting portion 44 and a second battery device not mountable in the mounting portion 44, the second battery device having an external shape approximately identical to that of the first battery device 1 but not having the second discrimination recesses 9a, 9b and the third discrimination recesses 13a, 13b.

In order to obtain such a function, as shown in FIGS. 9A to 9C, the first hook piece 61a having the first discrimination projection 53a of the first hook 61 is provided in a position where the first hook piece 61a may be engaged with the second engaging piece 7b of the first engaging portion 7 of the battery device 1 mounted on the mounting portion 44 and may be inserted into the second discrimination recess 9a. Similarly, the second hook piece 61b having the first discrimination projection 53b of the first hook 61 is provided in a position where the second hook piece 61b may be engaged with the third engaging piece 7c of the first engaging portion 7 of the battery device 1 and may be inserted into the second discrimination recess 9b. The first hook piece 62a having the second discrimination projection 54a of the second hook 62 is provided in a position where the first hook piece 62a may be engaged with the second engaging piece 8b of the second engaging portion 8 of the battery device 1 and may be inserted into the third discrimination recess 13a. Similarly, the second hook piece 62b having the second discrimination projection 54b of the second hook 62 is provided in a position where the second hook piece 62b may be engaged with the third engaging piece 8c of the second engaging portion 8 of the battery device 1 and may be inserted into the third discrimination recess 13b. The first discrimination projections 53a to 54b show a specific example of a projection in an embodiment of the present invention.

FIG. 7 shows a state where the four hook pieces 61a to 62b are inserted into the four penetration holes 51a, 51b, 52a, 52b. In this insertion state, an operation projection 66 provided in the operation portion 60b of the slide member 60 is slidably inserted into the insertion hole 48a provided on the upper facing 48 of the rear panel 21D, and accordingly a top of the operation projection 66 protrudes toward a rear surface side. The operation projection 66 protrudes in a direction identical to those of the four hook pieces 61a to 62b with a height approximately equal to those of the four hook pieces 61a to 62b. A long hole 67 to store the coil spring 65 and an opening window 68 to avoid interference with other components are also provided in the base 60a of the slide member 60.

A slide side spring bearing piece 69 in which one edge of the coil string 65 sits is provided on one side of the long hole 67 in the base 60a in a longitudinal direction Y1. A rear panel 21D side spring bearing portion 71 provided opposite to the spring bearing piece 69 is inserted into the other side of the long hole 67 in the longitudinal direction Y1. The spring bearing portion 71 is provided on a rear surface of the rear panel 21D, and the coil string 65 in a compressed state is present between the spring bearing portion 71 and the spring bearing piece 69. The slide member 60 is always energized away from the connection terminal 56 by an elastic force of the coil spring 65.

The support plate member 64 slidably supports the slide member 60 between the support plate member 64 and the rear panel 21D and functions to prevent dropping of the coil spring 65. The support plate member 64 is formed smaller than the rear panel 21D but larger than the slide member 60 and is clamped and fixed to the rear panel 21D by a fixing screw. Multiple attachment brackets 64a and fixing portions 64b are provided in the support plate member 64.

The mounting portion 44 having such a configuration may be assembled as follows, for example. First, as shown in FIG. 8, the slide member 60 is allowed to face a rear surface of the rear panel 21D, and the support plate member 64 is placed on the rear surface of the slide member 60 to hold the slide member 60 between the rear panel 21D and the support plate member 64. Then, the four hook pieces 61a, 61b, 62a, 62b protruding on one surface of the base 60a of the slide member 60 are inserted and allowed to penetrate into the four penetration holes 51a, 51b, 52a, 52b provided in the opening 45 of the rear panel 21D, respectively, from the rear surface of the rear panel 21D. Accordingly, tops of the four hook pieces 61a to 62b are each allowed to protrude into the opening 45, and a predetermined clearance is formed between an internal surface of each nail and the bottom surface 45a of the opening 45.

At the same time, the operation projection 66 provided on a top of the operation portion 60b of the slide member 60 is inserted and allowed to penetrate into the insertion hole 48a provided in the upper facing 48 protruding from an upper side of the opening 45 of the rear panel 21D. Next, the coil spring 65 is allowed to be present between the spring bearing portion 71 of the rear panel 21D and the spring bearing piece 69 of the slide member 60. Thereafter, the support plate member 64 is overlapped with the slide member 60, and the support plate member 64 is clamped and fixed to the rear panel 21D by a fixing screw. Accordingly, the slide member 60 is slidably supported between the support plate member 64 and the rear panel 21D. The slide member 60 is always energized away from the connection terminal 56 by an elastic force of the coil spring 65. Assembly of the mounting portion 44 is completed in this manner, and the rear panel 21D may be assembled.

The battery device 1 may be mounted on and detached from the mounting portion 44 formed as described above in the following manner, for example. FIG. 9A is a view describing the rear panel 21D with a front view of the mounting portion 44, FIG. 9B is a view describing a state when insertion of the battery device 1 starts, and FIG. 9C is a view describing a locked state when insertion of the battery device 1 is completed. In FIGS. 9B and 9C, the three engaging pieces 8a, 8b, 8c of the second engaging portion 8 are engaged with the two hook pieces 62a, 62b of the second hook 62 and the second protrusion piece 55b in the same manner in which the three engaging pieces 7a, 7b, 7c of the first engaging portion 7 formed symmetrically with the engaging pieces 8a, 8b, 8c are engaged with the two hook pieces 61a, 61b of the first hook 61 and the first protrusion piece 55a. Therefore, an operation of one set formed with the first engaging portion 7 and others is described here, and description of an operation of the other set formed with the second engaging portion 8 and others is omitted.

First, a case of mounting the battery device 1 in the mounting portion 44 will be described. In this case, as shown in FIG. 9B, a front surface on a output terminal 3 side of the battery device 1 is allowed to face a lower edge of the opening 45 of the mounting portion 44. The first engaging piece 7a of the first engaging portion 7 and the first engaging piece 8a of the second engaging portion 8 provided on both sides of a first surface of the battery device 1 in the crosswise direction X are each and engaged by hooking with the first protrusion piece 55a and the second protrusion piece 55b provided on both corners of the lower edge of the opening 45. In such an engaging state, the battery device 1 is rotated closer to the mounting portion 44 with contact areas with the two protrusion pieces 55a, 55b as rotation centers.

Accordingly, the second engaging piece 7b of the battery device 1 approaches the first hook piece 61a, the third engaging piece 7c approaches the second hook piece 61b, and the second engaging piece 7b is brought into contact with the first hook piece 61a. The battery device 1 in this state is rotated and pushed into the opening 45, so that the second engaging piece 7b presses and moves the first hook piece 61a toward the connection terminal 56 against an elastic force of the coil spring 65. When the second engaging piece 7b hurdles the first hook piece 61a, the third engaging piece 7c is then brought into contact with the second hook piece 61b. When the third engaging piece 7c hurdles the second hook piece 61b, the battery device 1 is completely inserted into the opening 45, and the lower surface 5a as a second surface of the battery device 1 is brought into contact with the bottom surface 45a as a second surface of the mounting portion 44.

As a result, the output terminal 3 of the battery device 1 is connected to the connection terminal 56 of the mounting portion 44. Accordingly, the battery device 1 is electrically connected to the digital video camera 20, and power of the battery device 1 is supplied to the digital video camera 20 from the output terminal 3 through the connection terminal 56. Record the subject to operate the digital video camera 20 to photograph a subject and record the subject in a recording medium and to watch photographic information recorded in the recording medium in the display device 23, for example.

In this case, the first discrimination projection 53a provided in the first hook piece 61a of the first hook 61 is inserted into the second discrimination recess 9a provided on the first step surface 6a of the battery device 1. Similarly, the second discrimination projection 54a provided in the first hook piece 62a of the second hook 62 is inserted into the third discrimination recess 13a provided on the second step surface 6b of the battery device 1. The first discrimination projection 53b provided in the second hook piece 61b of the first hook 61 is inserted into the second discrimination recess 9b provided on the first step surface 6a of the battery device 1. Similarly, the second discrimination projection 54b provided in the second hook piece 62b of the second hook 62 is inserted into the third discrimination recess 13b provided on the second step surface 6b of the battery device 1.

Since the first hook piece 61a and the second hook piece 61b are free in this manner, the slide member 60 slides away from the connection terminal 56 by an elastic force of the coil spring 65. As a result, as shown in FIG. 9C, the first hook piece 61a is engaged with the second engaging piece 7b and the second hook piece 61b is engaged with the third engaging piece 7c. Similarly, in the second hook 62, the first hook piece 62a is engaged with the second engaging piece 8b and the second hook piece 62b is engaged with the third engaging piece 8c. Accordingly, the battery device 1 is locked by the four hook pieces 61a, 61b, 62a, 62b engaged with the four engaging pieces 7b, 7c, 8b, 8c and fixed to the mounting portion 44.

On the other hand, it may be impossible to mount a battery device in the mounting portion 44 when the battery device does not have the second discrimination recesses 9a, 9b and the third discrimination recesses 13a, 13b corresponding to the first discrimination projections 53a, 53b and the second discrimination projections 54a, 54b on the first step surface 6a and the second step surface 6b, respectively.

Accordingly, the second discrimination recesses 9a, 9b and the third discrimination recesses 13a, 13b are provided in the battery device 1, and the first discrimination projections 53a, 53b and the second discrimination projections 54a, 54b corresponding to the discrimination recesses are provided in the mounting portion 44. In this manner a type of the battery device may be discriminated based on a simple structure without further complicating a shape of the first discrimination recesses 15a, 15b of the battery device 1, even if the number of types of the battery device is further increased.

When the battery device 1 mounted on the mounting portion 44 is removed, a user manually operates the operation projection 66 toward a disengaging side as shown in FIG. 9C. Specifically, in this example, the user presses the operation projection 66 to allow the slide member 60 to slide toward the connection terminal 56 against an elastic force of the coil spring 65. The slide member 60 is moved to a place where the four hook pieces 61a, 61b, 62a, 62b are detached from the four engaging pieces 7b, 7c, 8b, 8c, so that the battery device 1 may be removed. Consequently, the battery device 1 may be removed from the mounting portion 44 by raising an edge opposite to the output terminal 3 of the battery device 1 and rotating the battery device 1 with the two first engaging pieces 7a, 8a engaged with the two protrusion pieces 55a, 55b as centers.

FIGS. 10 and 11A show a second example of a mounting portion of an electronic apparatus according to an embodiment of the present invention. This mounting portion 74 differs from the mounting portion 44 of the first example in that a first hook 81 and a second hook 82 are securely fixed in an opening 75 of a rear panel 73 and a stopper member 77 is provided to limit movement of the battery device 1 mounted on a predetermined position of the mounting portion 74. Since the mounting portion is formed in the same manner as in the first example except for that point, the same components as in the first example are indicated by the same symbols and their repeated description is omitted, and different components are selectively described.

The opening 75 of the rear panel 73 has: a bottom surface 75a as an approximately rectangular second surface of the mounting portion 74; a lower surface 75b as a first surface continuous with one side of the bottom surface 75a in a longitudinal direction Y1 and approximately perpendicular to the bottom surface 75a; a left side surface 75d continuous with one side of the bottom surface 75a in a crosswise direction X1 at right angles to the longitudinal direction Y1 and approximately perpendicular to the bottom surface 75a; and a right side surface 75e continuous with the other side of the bottom surface 75a in the crosswise direction X1 and approximately perpendicular to the bottom surface 75a. The opening 75 for the mounting portion 74 is formed with the bottom surface 75a, the lower surface 75b, the left side surface 75d, and the right side surface 75e. The opening 75 is provided in the rear panel 73 with the longitudinal direction Y1 set to be a vertical direction.

The first hook 81 has: a first hook piece 81a placed on a connection terminal 56 side; and a second hook piece 81b placed at a predetermined interval in the longitudinal direction Y1 from the first hook piece 81a. The first hook piece 81a is formed protruding inward from and integrally with the left side surface 75d of the rear panel 73. A first protrusion piece 55a is provided on a connection terminal 56 side of the first hook piece 81a. Similarly, the second hook 82 has: a first hook piece 82a placed on a connection terminal 56 side; and a second hook piece 82b placed at a predetermined interval in the longitudinal direction Y1 from the first hook piece 82a. The first hook piece 82a is formed protruding inward from and integrally with the right side surface 75e of the rear panel 73. A second protrusion piece 55b is provided on a connection terminal 56 side of the first hook piece 82a.

The second hook piece 81b of the first hook 81 is formed continuously and integrally with the bottom surface 75a and the left side surface 75d of the opening 75. The second hook piece 82b of the first hook 82 is formed continuously and integrally with the bottom surface 75a and the right side surface 75e of the opening 75. Cast holes 78 for injection molding using a die are formed in the bottom surface 75a for the four hook pieces 81a, 81b, 82a, 82b and the left and right protrusion pieces 55a, 55b, respectively. A second discrimination projection 79 to discriminate a type of the battery device 1 is provided between the second protrusion piece 55b and a fitting hole 50 for a connection terminal 56.

Further, as in the first example, discrimination projections 53a, 53b, 54a, 54b inserted into the second discrimination recesses 9a, 9b and the third discrimination recesses 13a, 13b of the battery device 1, respectively, are provided in nails of the four hook pieces 81a to 82b, respectively. The four first discrimination projections 53a to 54b are formed protruding away from the bottom surface 75a on external surfaces of the nails, respectively.

The stopper member 77 is placed to be brought into contact with the right side surface 75e on a side opposite to the lower surface 75b of the mounting portion 74. The stopper member 77 is formed with: a stopper 77a protruding toward an upper portion of the battery device 1 mounted on the mounting portion 74 to regulate upward movement in the longitudinal direction Y1 of the battery device 1; and an operation portion 77b continuous with the stopper 77a and protruding forward from the opening 75. The stopper member 77 is energized by an elastic member (not shown) to always protrude forward. At this time, the stopper 77a protrudes toward an upper portion of the battery device 1, so that the battery device 1 is prevented from being moved and dropped from the mounting portion 74. When the operation portion 77b is pressed against an elastic force of the elastic member to move the stopper 77a backward, a surface of the stopper 77a is pressed down to a place coplanar with the bottom surface 75a. Accordingly, the battery device 1 may be moved in the longitudinal direction Y1.

The battery device 1 of the first example of an embodiment of the present invention may be mounted on and detached from the mounting portion 74 having such a configuration as follows, for example. FIG. 11A is a view describing the rear panel 73 with a front view of the mounting portion 44, FIG. 11B is a view describing a state when insertion of the battery device 1 starts, and FIG. 11C is a view describing a locked state when insertion of the battery device 1 is completed. In FIGS. 11B and 11C, the three engaging pieces 8a, 8b, 8c of the second engaging portion 8 are engaged with the two hook pieces 82a, 82b of the second hook 82 and the second protrusion piece 55b in the same manner in which the three engaging pieces 7a, 7b, 7c of the first engaging portion 7 formed symmetrically with the engaging pieces 8a, 8b, 8c are engaged with the two hook pieces 81a, 81b of the first hook 81 and the first protrusion piece 55a. Therefore, an operation of one set formed with the first engaging portion 7 and others is described here, and description of an operation of the other set formed with the second engaging portion 8 and others is omitted.

First, a case of mounting the battery device 1 in the mounting portion 74 will be described. In this case, as shown in FIG. 11B, the lower surface 5a of the battery device 1 is allowed to face the bottom surface 75a to make the lower surface 5a approximately parallel to the bottom surface 75a on an upper side (side opposite to the connection terminal 56) of the opening 75 of the mounting portion 74. The battery device 1 is pressed against an energizing force of the stopper member 77, and the first hook piece 81a of the first hook 81 is inserted into the first opening 10a between the first engaging piece 7a and the second engaging piece 7b of the first engaging portion 7. At the same time, the second hook piece 81b of the first hook 81 is inserted into the second opening 10b between the second engaging piece 7b and the third engaging piece 7c of the first engaging portion 7. Accordingly, the lower surface 5a as a second surface of the battery device 1 is brought into contact with the bottom surface 75a as a second surface of the mounting portion 74.

In this case, as in the aforementioned example, the first discrimination projection 53a provided in the first hook piece 81a of the first hook 81 is inserted into the second discrimination recess 9a provided on the first step surface 6a of the battery device 1. Similarly, the second discrimination projection 54a provided in the first hook piece 82a of the second hook 82 is inserted into the third discrimination recess 13a provided on the second step surface 6b of the battery device 1. The first discrimination projection 53b provided in the second hook piece 81b of the first hook 81 is inserted into the second discrimination recess 9b provided on the first step surface 6a of the battery device 1. Similarly, the second discrimination projection 54b provided in the second hook piece 82b of the second hook 82 is inserted into the third discrimination recess 13b provided on the second step surface 6b of the battery device 1.

Next, the battery device 1 is allowed to slide toward the connection terminal 56. Accordingly, as shown in FIG. 11C, in the first hook 81, the second engaging piece 7b is engaged with the first hook piece 81a and the third engaging piece 7c is engaged with the second hook piece 81b. Similarly, in the second hook 82, the second engaging piece 8b is engaged with the first hook piece 82a and the third engaging piece 8c is engaged with the second hook piece 82b. Accordingly, the battery device 1 is locked by the four hook pieces 81a, 81b, 82a, 82b engaged with the four engaging pieces 7b, 7c, 8b, 8c. At the same time, the stopper member 77 is energized to outside, so that the stopper 77a protrudes toward an upper portion of the battery device 1 and the stopper 77 is brought into contact with the third step surface 6c of the battery device 1. This prevents the battery device 1 from being moved in the longitudinal direction Y1 and dropped from the mounting portion 74.

At this time, the output terminal 3 of the battery device 1 is connected to the connection terminal 56 of the mounting portion 74. Accordingly, the battery device 1 is electrically connected to the digital video camera 20, and power of the battery device 1 is supplied to the digital video camera 20 from the output terminal 3 through the connection terminal 56. Accordingly, the digital video camera 20 may be operate to photograph a subject and record the subject in a recording medium and to watch photographic information recorded in the recording medium in the display device 23, for example.

Further, it may be impossible to mount a battery device in the mounting portion 74 when the battery device does not have the second discrimination recesses 9a, 9b and the third discrimination recesses 13a, 13b corresponding to the first discrimination projections 53a, 53b and the second discrimination projections 54a, 54b on the first step surface 6a and the second step surface 6b, respectively.

Accordingly, the mounting portion 74 of this example has the first discrimination projections 53a, 53b and the second discrimination projections 54a, 54b in addition to the discrimination projection 79 used heretofore. Accordingly, it is possible to discriminate a type of the battery device based on a simple structure without complicating a shape of the discrimination projection 79, even if the number of types of the battery device is further increased. The battery device 1 may be mounted not only in the mounting portion 44 of the first example but also the mounting portion 74 of the second example having a different mounting structure.

Next, when the battery device 1 mounted on the mounting portion 74 is removed, a user manually operates the operation portion 77b toward a disengaging side as shown in FIG. 11C. Specifically, in this example, the user presses the operation portion 77b to press a surface of the stopper 77a of the stopper member 77 down to a plane coplanar with the bottom surface 75a against an energizing force of the elastic body. The battery device 1 is allowed to slide to a place where the four engaging pieces 7b, 7c, 8b, 8c are detached from the four hook pieces 81a, 81b, 82a, 82b. Accordingly, the four engaging pieces 7b, 7c, 8b, 8c are disengaged from the four hook pieces 81a, 81b, 82a, 82b, and the battery device 1 may be removed. At this time, the output terminal 3 of the battery device 1 is pulled from the connection terminal 56, and the battery device 1 is electrically disconnected from the digital video camera 20. Consequently, the battery device 1 may be removed by pulling the battery device 1 away from the opening 75.

FIGS. 12 and 13 show a second example of a battery device according to an embodiment of the present invention. The battery device 1A of the second example differs from the battery device 1 of the first example in that a second discrimination recess 9A is provided by chamfering a corner of a first step surface 6aA over a predetermined length R in a longitudinal direction Y from one edge on an output terminal 3 side, and similarly a third discrimination recess 13A is provided by chamfering a corner of a second step surface 6bA over the predetermined length R in the longitudinal direction Y from one edge on an output terminal 3 side. The battery device 1A is formed in the same manner as in the battery device 1 of the first example except for that point.

In this example, the length R of each of the second discrimination recess 9A and the third discrimination recess 13A in the longitudinal direction Y is set to be approximately equal to or less than a length between one edge on the output terminal 3 side and each of the third ribs 11c, 12c. However, the length R of each of the second discrimination recess 9A and the third discrimination recess 13A in an embodiment of the present invention is not limited to the length in this example, and may be variously modified according to a type of the battery device. For example, the second discrimination recess 9A and the third discrimination recess 13A may be asymmetrically formed to have different lengths R in the longitudinal direction Y. It is also possible to form the second discrimination recess 9A or the third discrimination recess 13A on either one of the first step surface 6aA and the second step surface 6bA. Further, it is also possible to variously modify a chamfering depth of a corner of each of the first step surface 6aA and the second step surface 6bA.

FIGS. 14 and 15 show a third example of a mounting portion of an electronic apparatus according to an embodiment of the present invention which corresponds to the battery device 1A of the second example. The mounting portion 74A differs from the mounting portion 74 of the second example in that first discrimination projections 53aA, 53bA and second discrimination projections 54aA, 54ba provided in nails of a first hook 81A and a second hook 82A, respectively, are each formed to have a shape corresponding to a shape of each of the second discrimination recess 9A and the third discrimination recess 13A of the battery device 1A. The mounting portion 74A is formed in the same manner as in the mounting portion 74 of the second example except for that point.

In this example, as shown in FIGS. 14 and 15, inclined planes corresponding to an inclination angle of the second discrimination recess 9A of the battery device 1A are provided on side surfaces of a first hook piece 81aA and a second hook piece 81bA of the first hook 81A. Inclined planes formed continuously and integrally with an inclined plane on a side surface of the first hook 81A are provided on side surfaces of the first discrimination projections 53aA, 53bA. Similarly, inclined planes corresponding to an inclination angle of the third discrimination recess 13A of the battery device 1A are provided on side surfaces of a first hook piece 82aA and a second hook piece 82bA of the second hook 82A. Inclined planes formed continuously and integrally with an inclined plane on a side surface of the second hook 82A are provided on side surfaces of the second discrimination projections 54aA, 54bA.

FIG. 16 shows a fourth example of a mounting portion of an electronic apparatus according to an embodiment of the present invention which corresponds to the battery device 1A of the second example. The mounting portion 104 of this example is formed with a hollow battery holder 103.

The mounting portion 104 has a bottom surface 105a, a lower surface 105b, an opening surface 105c, a left side surface 105d, a right side surface 105e, and a front surface 105f. The bottom surface 105a is an approximately rectangular second surface of the mounting portion 104. The lower surface 105b has a first surface continuous with one side of the bottom surface 105a in a longitudinal direction Y2 and approximately perpendicular to the bottom surface 105a. The opening surface 105c is opposite to the lower surface 105b and opened in a shape identical to that of the lower surface 105b. The left side surface 105d has a left step surface 107a continuous with the bottom surface 105a with a predetermined step on one side of the bottom surface 105a in a crosswise direction X2 at right angles to the longitudinal direction Y2 and is approximately perpendicular to the bottom surface 105a. The right side surface 105e has a right step surface 107b continuous with the bottom surface 105a with a predetermined step on the other side of the bottom surface 105a in the crosswise direction X2 and is approximately perpendicular to the bottom surface 105a. The front surface 105f is opposite to the bottom surface 105a and continuous with and approximately perpendicular to the lower surface 105b. A corner at which the front surface 105f intersects with the left side surface 105d and a corner at which the front surface 105f intersects with the right side surface 105e are each formed in a circular shape having a large radius of curvature. Further, the mounting portion 104 is formed with the bottom surface 105a, the lower surface 105b, the opening surface 105c, the left side surface 105d, the right side surface 105e, and the front surface 105f. The mounting portion 104 is provided in the battery holder 103 with the longitudinal direction Y2 set to be a vertical direction.

The left step surface 107a and the right step surface 107b are each set to have a length in a height direction Z2 (height) from the bottom surface 105a which is approximately equal to a height of each of the first step surface 6aA and the second step surface 6bA of the battery device 1A. Further, the left step surface 107a and the right step surface 107b are formed to be approximately parallel to the bottom surface 105a, respectively. In addition, as shown in FIG. 16, the mounting portion 104 has: a left connection surface 106a that connects one side of the bottom surface 105a in the crosswise direction X2 to one side of the left step surface 107a in the crosswise direction X2 and is approximately perpendicular to the bottom surface 105a and the left step surface 107a; and a right connection surface 106b that connects the other side of the bottom surface 105a in the crosswise direction X2 to one side of the right step surface 107b in the crosswise direction X2 and is approximately perpendicular to the bottom surface 105a and the right step surface 107b.

The left connection surface 106a has a first hook 111 provided continuously with the left connection surface 106a and having a predetermined length from one edge on a lower surface 105b side in the longitudinal direction Y2. The first hook 111 is formed integrally with the left connection surface 106a to protrude inward from the left connection surface 106a with predetermined width and thickness. Similarly, the right connection surface 106b has a second hook 112 provided continuously with the right connection surface 106b and having a predetermined length from one edge on a lower surface 105b side in the longitudinal direction Y2. The second hook 112 is formed integrally with the right connection surface 106b to protrude inward from the right connection surface 106b with predetermined width and thickness.

A corner at which the left step surface 107a intersects with the left side surface 105d has a first discrimination projection 113 provided continuously and integrally with the corner and having a predetermined length from one edge on a lower surface 105b side in the longitudinal direction Y2. The first discrimination projection 113 is formed to connect the left step surface 107a to the left side surface 105d at a predetermined inclination angle. Similarly, a corner at which the right step surface 107b intersects with the right side surface 105e has a second discrimination projection 114 provided continuously and integrally with the corner and having a predetermined length from one edge on a lower surface 105b side in the longitudinal direction Y2. The second discrimination projection 114 is formed to connect the right step surface 107b to the right side surface 105e at a predetermined inclination angle.

The battery device 1A may be mounted on and detached from the mounting portion 104 having such a configuration as follows, for example. First, a case of mounting the battery device 1A in the mounting portion 104 will be described. In this case, the front surface 5b as a first surface of the battery device 1A is allowed to face the opening surface of the mounting portion 104 on an upper side of the mounting portion 104. Then, the first engaging portion 7 of the battery device 1A is engaged with the first hook 111, and similarly the second engaging portion 8 of the battery device 1A is engaged with the second hook 112. Next, the battery device 1A is inserted into the mounting portion 104 along the first hook 111 and the second hook 112 until the output terminal 3 is engaged with the connection terminal 56.

Accordingly, the first hook 111 is engaged with the first engaging piece 7a, the second engaging piece 7b, and the third engaging piece 7c of the first engaging portion 7 of the battery device 1A. Similarly, the second hook 112 is engaged with the first engaging piece 8a, the second engaging piece 8b, and the third engaging piece 8c of the second engaging portion 8 of the battery device 1A. This may prevent movement of the battery device 1A in the height direction Z2. As shown in FIG. 17, according to this example, the battery device 1A may be stored in the mounting portion 104A having a dimension in the height direction Z2 larger than that of the battery device 1A.

A protrusion length (width) of each of the third ribs 11c, 12c most distant from the output terminal 3 of the battery device 1A is set to be approximately equal to a protrusion length (width) N of each of the third engaging pieces 7c, 8c. Accordingly, the third ribs 11c, 12c are brought into contact with the first hook 111 and the second hook 112 when the battery device 1A is inserted into the mounting portion 104 from the rear surface. Therefore, a user may immediately understand that the battery device 1A is inserted in a wrong direction.

Next, a user may remove the battery device 1A mounted on the mounting portion 104 by holding portion of the battery device 1A exposed from the mounting portion 104 and pulling out the battery device upward. It is also possible to remove the battery device 1A by pushing the battery device 1A out of the mounting portion 104 using a battery device removing portion (not shown).

The battery device 1A having such a configuration may also exhibit the same effect as in the battery device 1 of the first example. That is, it is possible to discriminate a type of the battery device based on a simple structure without further complicating a shape of the first discrimination recesses 15a, 15b of the battery device 1, even if the number of types of the battery device is further increased. Further, the battery device 1A may be mounted on mounting portions having different mounting structures and thus may be effectively used.

As described above, according to a battery device, an electronic apparatus, and a battery system according to embodiments of the present invention, it is possible to discriminate a type of the battery device even when the battery device and the electronic apparatus have different attachment structures, one battery device may be used for multiple types of an electronic apparatus, and, on the contrary, one battery device may be used as an exclusive component for one type of an electronic apparatus. Accordingly, undesired use of a battery device may be prevented, and a predetermined battery device may be used for a predetermined type of an electronic apparatus to improve safety. A type of the battery device may be discriminated in multiple stages by changing a length, width, or position of a projection.

The present invention is not limited to the embodiments described above and shown in the drawings, and various modifications may be effected without departing from the gist of the present invention. For example, in the aforementioned example, a battery device according to an embodiment of the present invention is used for a digital video camera as a specific example of an imaging device; however, the battery device may be used not only for a digital video camera, obviously, but also for various other types of an electronic apparatus such as an electronic still camera, a personal computer, an electronic dictionary, a DVD player, and a car navigation system. In the aforementioned example, an example is described where six engaging pieces are provided in a battery device and four hook pieces or two hooks are provided in a mounting portion; however, it is obvious that the number of the engaging pieces is not limited to six, the number of the hook pieces is not limited to four, and the number of the hooks is not limited to two.

It should be understood by those skilled in the art that various modifications, combinations, sub-combinations and alterations may occur depending on design requirements and other factors insofar as they are within the scope of the appended claims or the equivalents thereof.

What is claimed is:

1. A battery having a battery cell and an output terminal to output power from the battery cell, the battery comprising:
a first surface;
a second surface approximately perpendicular to the first surface;
a first step surface provided at a first side of the second surface in a crosswire direction, the first step surface approximately parallel to the second surface and including a predetermined step;
a second step surface provided at a second side of the second surface in the crosswise direction, the second step surface approximately parallel to the second surface and including a predetermined step;
a first engaging portion protruding from the first side of the second surface with predetermined width and thickness in the crosswise direction;
a second engaging portion protruding from the second side of the second surface with predetermined width and thickness in the crosswise direction; and
a step provided in at least one of the first and second step surfaces, wherein
the first step surface extends between opposing first and second ends of the first step surface in a lengthwise direction,
the second step surface extends between opposing first and second ends of the second step surface in the lengthwise direction, and
the first ends of the first and second step surfaces are at respective corners between the first and second step surfaces and the first surface.

2. The battery according to claim 1, wherein the second ends of the first and second step surfaces extend beyond an end of the second surface in the lengthwise direction.

3. The battery according to claim 2, further comprising:
a third surface approximately perpendicular to the second surface and provided at an opposing end of the battery with respect to the first surface; and
a third step surface provided at a side of the second surface in the lengthwise direction, the third step surface approximately parallel to the second surface and including a predetermined step that separates the second surface from the third surface.

4. The battery according to claim 3, wherein third step surface connects the first step surface to the second step surface.

5. The battery according to claim 1, wherein the first or second engaging portion hangs over the step in the lengthwise direction.

6. The battery according to claim 1, further comprising the battery cell and the output terminal, wherein the output terminal is provided at a corner between the first and second surfaces.

7. The battery according to claim 1, wherein the at least one of the first and second step surfaces is uneven due to the step.

8. The battery according to claim 1, wherein at least one of the first step surface and the second step surface includes one or more bevels, and the at least one of the first step surface and the second step surface is uneven due to the step and the one or more bevels.

9. The battery according to claim 1, further comprising:
a third engaging portion protruding from the first side of the second surface with predetermined width and thickness in the crosswise direction; and
a fourth engaging portion protruding from the second side of the second surface with predetermined width and thickness in the crosswise direction, wherein
the third and fourth engaging portions are provided proximate to a corner between the first surface and the second surface, and
the third and fourth engaging portions and the first ends of the first and second step surfaces form respective grooves between the third and fourth engaging portions and respective ones of the first ends of the first and second step surfaces, and
the grooves are open to the first surface in the lengthwise direction and are respectively open to one of opposing directions of the crosswise direction.

10. The battery according to claim 1, wherein the battery is configured to supply power to an imaging apparatus.

11. A battery having a battery cell and an output terminal to output power from the battery cell, the battery comprising:
a first surface;
a second surface approximately perpendicular to the first surface;
a first step surface provided at a first side of the second surface in a crosswise direction, the first step surface approximately parallel to the second surface and including a predetermined step;
a second step surface provided at a second side of the second surface in a crosswise direction, the second step surface approximately parallel to the second surface and including a predetermined step;

a first engaging portion protruding from the first side of the second surface with predetermined width and thickness in the crosswise direction;

a second engaging portion protruding from the second side of the second surface with predetermined width and thickness in the crosswise direction; and steps provided in at least one of the first and second step surfaces, wherein the first step surface extends between opposing first and second ends of the first step surface in a lengthwise direction, the second step surface extends between opposing first and second ends of the second step surface in the lengthwise direction, and the first ends of the first and second step surfaces are at respective corners between the first and second step surfaces and the first surface.

12. The battery according to claim 11, wherein the second ends of the first and second step surfaces extend beyond an end of the second surface in the lengthwise direction.

13. The battery according to claim 12, further comprising:

a third surface approximately perpendicular to the second surface and provided at an opposing end of the battery with respect to the first surface; and a third step surface provided at a side of the second surface in the lengthwise direction, the third step surface approximately parallel to the second surface and including a predetermined step that separates the second surface from the third surface.

14. The battery according to claim 13, wherein third step surface connects the first step surface to the second step surface.

15. The battery according to claim 11, wherein the steps include a pair of first steps provided in the first step surface that are separated by a first non-stepped portion of the first step surface.

16. The battery according to claim 15, wherein the first steps form first stepped portions of the first step surface that are further apart from the second surface than the first non-stepped portion of the first step surface.

17. The battery according to claim 16, wherein the first step surface is a contiguous uneven surface that is separated from the second surface.

18. The battery according to claim 17, wherein:

the steps include a pair of second steps provided in the second step surface that are separated by a second non-stepped portion of the second step surface;

the second steps form second stepped portions of the second step surface that are further apart from the second surface than the second non-stepped portion of the second step surface; and the second step surface is a contiguous uneven surface that is separated from the second surface.

19. The battery according to claim 11, wherein:

the first or second engaging portion hangs over one of the steps in the lengthwise direction, and the at least one of the first and second step surfaces is uneven due to the steps.

20. The battery according to claim 11, further comprising:

a third engaging portion protruding from the first side of the second surface with predetermined width and thickness in the crosswise direction; and a fourth engaging portion protruding from the second side of the second surface with predetermined width and thickness in the crosswise direction, wherein the third and fourth engaging portions are provided proximate to a corner between the first surface and the second surface, and the third and fourth engaging portions and the first ends of the first and second step surfaces form respective grooves between the third and fourth engaging portions and respective ones of the first ends of the first and second step surfaces, and the grooves are open to the first surface in the lengthwise direction and are respectively open to one of opposing directions of the crosswise direction.

* * * * *